US012750873B2

(12) United States Patent

Hassan et al.

(10) Patent No.: US 12,750,873 B2

(45) Date of Patent: Sep. 29, 2026

(54) METHOD AND APPARATUS FOR PROCESSING DATA ASSOCIATED WITH A TERMINAL DEVICE

(71) Applicant: Robert Bosch GmbH, Stuttgart (DE)

(72) Inventors: Khaled Shawky Hassan, Sarstedt (DE); Sudeep Hegde, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 476 days.

(21) Appl. No.: 18/361,753

(22) Filed: Jul. 28, 2023

(65) Prior Publication Data

US 2024/0057135 A1 Feb. 15, 2024

(30) Foreign Application Priority Data

Aug. 11, 2022 (EP) .................................... 22190027

(51) Int. Cl.
*H04W 72/40* (2023.01)
*H04W 92/18* (2009.01)

(52) U.S. Cl.
CPC ............ *H04W 72/40* (2023.01); *H04W 92/18* (2013.01)

(58) Field of Classification Search
CPC ....... H04L 1/0001; H04L 5/00; H04L 5/0023; H04L 5/0025; H04W 16/14; H04W 24/08; H04W 72/02; H04W 72/04; H04W 72/0446; H04W 72/0453; H04W 72/046; H04W 72/12; H04W 72/40; H04W 72/542; H04W 88/06; H04W 92/18
See application file for complete search history.

(56) References Cited

U.S. PATENT DOCUMENTS

2016/0255613 A1* 9/2016 Faerber ................. H04W 72/52 370/330
2017/0280330 A1* 9/2017 Martin .............. H04W 72/0453
2018/0242163 A1* 8/2018 Patel ...................... H04W 48/10
2022/0232430 A1* 7/2022 Yang ............... H04W 36/00222
2022/0287083 A1* 9/2022 Gomes Baltar ... H04W 74/0808
(Continued)

OTHER PUBLICATIONS

IEEE 802.11P-2010 Standard, "IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments," IEEE Computer Society, 2010, pp. 1-51.
(Continued)

*Primary Examiner* — Thomas R Cairns
(74) *Attorney, Agent, or Firm* — NORTON ROSE FULBRIGHT US LLP

(57) ABSTRACT

A method for processing data associated with a terminal device configured to use at least a first radio technology, e.g. for communicating with at least one further terminal device over a sidelink interface based on the first radio technology. The method includes: determining a first parameter characterizing an activity of devices configured to use the first radio technology associated with predetermined radio resources, determining a second parameter characterizing an activity of devices configured to use at least one of a) the first radio technology, b) at least one further, e.g. second, radio technology, which is different from the first radio technology, associated with the predetermined radio resources.

13 Claims, 10 Drawing Sheets

(56) References Cited

U.S. PATENT DOCUMENTS

| | | | | |
|---|---|---|---|---|
| 2023/0032174 | A1* | 2/2023 | Li | H04W 72/02 |
| 2023/0370982 | A1* | 11/2023 | Dutta | H04W 72/1215 |
| 2024/0032077 | A1* | 1/2024 | Li | H04L 5/0085 |
| 2024/0251386 | A1* | 7/2024 | Hwang | H04L 5/0094 |
| 2024/0389119 | A1* | 11/2024 | Huang | H04W 72/25 |
| 2025/0301484 | A1* | 9/2025 | Zhao | H04W 92/18 |

OTHER PUBLICATIONS

Mediatek Inc., "On Co-Channel Coexistence Between LTE Sidelink and NR Sidelink," 3GPP TSG RANWG1 #109-E, RL-2204720, Mediatek Inc., 2022, pp. 1-6.

Sony, "Discussion on Co-Channel Coexistence for LTE Sidelink and NR Sidelink", 3GPP TSG RANWG1 #109-E, RL-2203736, Sony, 2022, pp. 1-3.

Interdigital Inc., "Co-Channel Coexistence for LTE Sidelink and NR Sidelink," 3GPP TSG RANWG1 #109-E, RL-2204049, Interdigital Inc., 2022, pp. 1-3.

Moderator, "FL Summary for AI 9.4.2—Co-Channel Coexistence for LTE and NR Sidelink," R1-2205588, Moderator: Fraunhofer HHI, RAN1 Meeting #109-E, 2022., pp. 1-137; Downloaded on Jul. 28, 2023 From: https://www.3gpp.org/dynareport?code=TDocExMtg--R1-109-e--60236.htm.

* cited by examiner

METHOD AND APPARATUS FOR PROCESSING DATA ASSOCIATED WITH A TERMINAL DEVICE

CROSS REFERENCE

The present application claims the benefit under 35 U.S.C. § 119 of European Patent Application No. EP 22 19 0027.7 filed on Aug. 11, 2022, which is expressly incorporated herein by reference in its entirety.

FIELD

The present invention relates to a method for processing data associated with a terminal device.

The present invention further relates to an apparatus for processing data associated with a terminal device.

SUMMARY

Exemplary embodiments of the present invention relate to a method, for example a computer-implemented method, for processing data associated with a terminal device configured to use at least a first radio technology, e.g. radio access technology, e.g. for communicating with at least one further terminal device over a sidelink interface based on the first radio technology, the method comprising: determining a first parameter characterizing an activity of devices configured to use, e.g. using, the first radio technology associated with predetermined radio resources, determining a second parameter characterizing an activity of devices configured to use, e.g. using, at least one of a) the first radio technology, b) at least one further, e.g. second, radio technology, e.g. radio access technology, which is different from the first radio technology, associated with the predetermined radio resources. In some exemplary embodiments, this e.g. enables to assess an activity of devices with respect to the predetermined radio resources, the devices e.g. being associated with the first radio technology and/or with the second radio technology.

In some exemplary embodiments of the present invention, the terminal device and/or the at least one further terminal device and/or at least one of the devices configured to use the first radio technology and/or the second radio technology can e.g. be used with a wireless, for example cellular, communications system, which is for example based on and/or adheres at least partially to at least one third generation partnership project, 3GPP, radio standard such as 4G (fourth generation), 5G (fifth generation), 6G (sixth generation) or other radio access technology.

In some exemplary embodiments of the present invention, the terminal device and/or the at least one further terminal device and/or at least one of the devices configured to use the first radio technology and/or the second radio technology may be a user equipment (UE) or a data transceiver modem, which, for example, may be associated with a mobile object such as e.g. a vehicle, for example car or truck or the like.

In some exemplary embodiments of the present invention, the terminal device and/or the at least one further terminal device and/or at least one of the devices configured to use the first radio technology and/or the second radio technology may be at least one of: an IoT (Internet of Things) device, an infrastructure component or part of an infrastructure component (e.g., traffic lights, street lights, traffic sign, toll gate), an industrial automation component, e.g. IIoT (Industrial IoT) component or infrastructure (e.g., robots, machines, etc.), a device for a mobile broadband user, and/or a vehicle.

In some exemplary embodiments of the present invention, the first radio technology is 5G NR V2X.

In some exemplary embodiments of the present invention, the second radio technology is LTE V2X.

In some exemplary embodiments of the present invention, the first radio technology is a, e.g. any, 3GPP C-V2X radio technology.

In some exemplary embodiments of the present invention, the second radio technology is a, e.g. any, non-3GPP V2X radio technology.

In some exemplary embodiments of the present invention, the predetermined radio resources may e.g. comprise at least one of time resources and frequency resources and/or other radio resources such as e.g. at least one radio beam.

In some exemplary embodiments of the present invention, the method comprises: evaluating the first parameter and the second parameter, for example evaluating the first parameter with respect to the second parameter.

In some exemplary embodiments of the present invention, the method comprises at least one of: a) comparing the first parameter with the second parameter, b) determining a third parameter based on the first parameter and the second parameter, wherein for example the third parameter is obtained as a ratio of the first parameter and the second parameter, c) comparing the third parameter with a, for example predetermined, threshold, d) performing an operation of the terminal device, for example at least temporarily, based on at least one of: d1) the third parameter, d2) the comparison of the third parameter with the threshold, d3) the comparison of the first parameter with the second parameter.

In some exemplary embodiments of the present invention, the method comprises at least one of: a) transmitting, to at least one further device, first information characterizing at least one of a1) the first parameter, a2) the second parameter, a3) the third parameter, a4) a result of the comparison, b) receiving, from at least one further device, second information characterizing an activity of at least one device configured to use at least the second radio technology, e.g. associated with the predetermined radio resources, c) performing an operation of the terminal device, for example at least temporarily, based on at least one of: c1) the first information, c2) the second information.

In some exemplary embodiments of the present invention, the performing of the operation of the terminal device comprises at least one of: a) altering a channel occupancy ratio, b) enabling, e.g. direct, blocking, c) postponing at least one transmission, d) changing, e.g. reselecting, radio resources, e) reducing a transmit power, f) reducing a transmission time, g) increasing a transmission periodicity, h) change at least one radio beam, e.g. to avoid a direction of at least one device using the second radio technology, i) transmit third information based on at least one of the first information and the second information, e.g. as inter-terminal device coordination information, e.g. to inform at least one further terminal device, e.g. using at least the first radio technology, j) considering, k) prioritizing transmissions.

In some exemplary embodiments of the present invention, the method comprises at least one of: a) a first radio technology to detect the activity of a second radio technology in a configured shared channel, b) using the first radio technology, e.g. by a terminal device, to detect an activity of the second radio technology in a configured shared channel.

Further exemplary embodiments of the present invention relate to an apparatus, for example for a terminal device, for performing the method according to the embodiments.

Further exemplary embodiments of the present invention relate to an apparatus, for example for a terminal device, comprising means, for performing the method according to the embodiments.

In some exemplary embodiments of the present invention, the apparatus and/or its functionality may e.g. be provided within the terminal device. In some exemplary embodiments, the apparatus and/or its functionality may e.g. be provided outside of the terminal device, e.g. in form of a, for example separate, device, that may e.g. be at least temporarily coupled with the terminal device.

Further exemplary embodiments of the present invention relate to a terminal device comprising at least one apparatus according to the embodiments.

Further exemplary embodiments of the present invention relate to an apparatus, e.g. an on board unit, OBU, comprising at least two, e.g. collocated, apparatus and/or at least two terminal devices according to the embodiments, e.g. a first terminal device according to the embodiments and a second terminal device according to the embodiments. In some exemplary embodiments, the first terminal device may e.g. be configured to use the first radio technology, e.g. 5G NR V2X. In some exemplary embodiments, the second terminal device may e.g. be configured to use the second radio technology, e.g. LTE V2X. In some exemplary embodiments, the first terminal device and the second terminal device may be configured to at least temporarily exchange information characterizing an activity of devices configured to use, e.g. using, the first radio technology associated with the predetermined radio resources and/or information characterizing an activity of devices configured to use, e.g. using, the second radio technology associated with the predetermined radio resources.

Further exemplary embodiments of the present invention relate to a communication system or communication network comprising at least one apparatus and/or at least one terminal device according to the embodiments.

In some exemplary embodiments of the present invention, the communication system or communication network may comprise at least one network device, e.g. base station, e.g. gNB, which is configured to at least temporarily serve at least one of the terminal devices.

Further exemplary embodiments of the present invention relate to a computer program comprising instructions which, when the program is executed by a computer, cause the computer to carry out the method according to the embodiments.

Further exemplary embodiments of the present invention relate to a computer-readable storage medium comprising instructions which, when executed by a computer, cause the computer to carry out the method according to the embodiments.

Further exemplary embodiments of the present invention relate to a data carrier signal carrying and/or characterizing the computer program according to the embodiments.

Further exemplary embodiments of the present invention relate to a use of the method according to the embodiments and/or of the apparatus according to the embodiments and/or of the communication system according to the embodiments and/or of the computer program according to the embodiments and/or of the computer-readable storage medium according to the embodiments and/or of the data carrier signal according to the embodiments for at least one of: a) determining an activity of devices using at least one of the first radio technology and the second radio technology within the predetermined radio resources, b) controlling, e.g. modifying an operation of the terminal device, c) enabling the terminal device to decide how to operate, e.g. with respect to a sidelink communication based on the first radio technology, based on an activity of at least one device, e.g. terminal device, using the second radio technology, d) supporting the at least one further device, e.g. with respect to an activity of devices configured to use the first radio technology associated with the predetermined radio resources and/or with respect to an activity of devices configured to use at least one of the first radio technology and at least one further, e.g. second, radio technology.

BRIEF DESCRIPTION OF THE DRAWINGS

Some exemplary embodiments of the present invention will now be described with reference to the figures.

DETAILED DESCRIPTION OF EXAMPLE EMBODIMENTS

Figure 1:
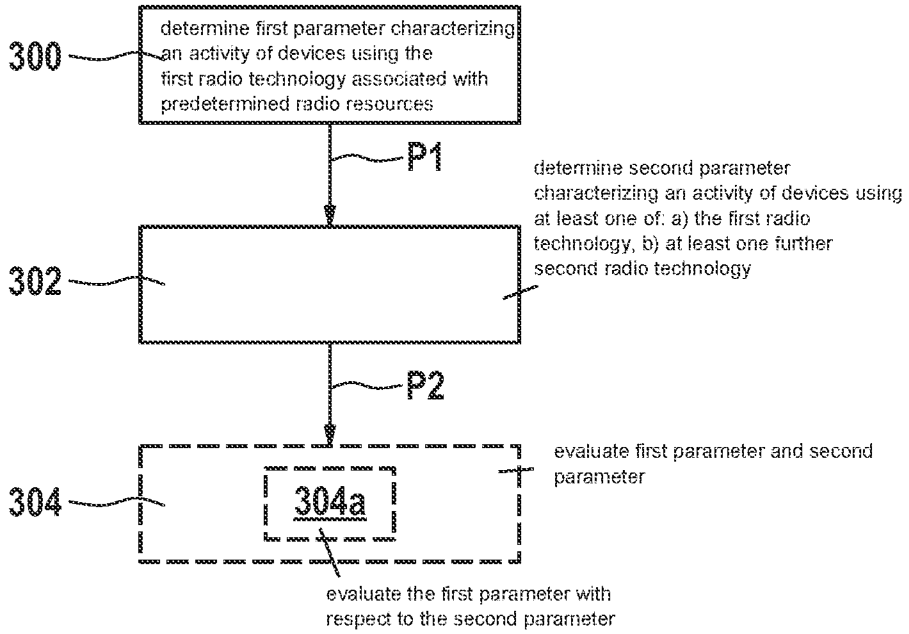
FIG. 1 schematically depicts a simplified flow-chart according to exemplary embodiments of the present invention.
Figure 2:
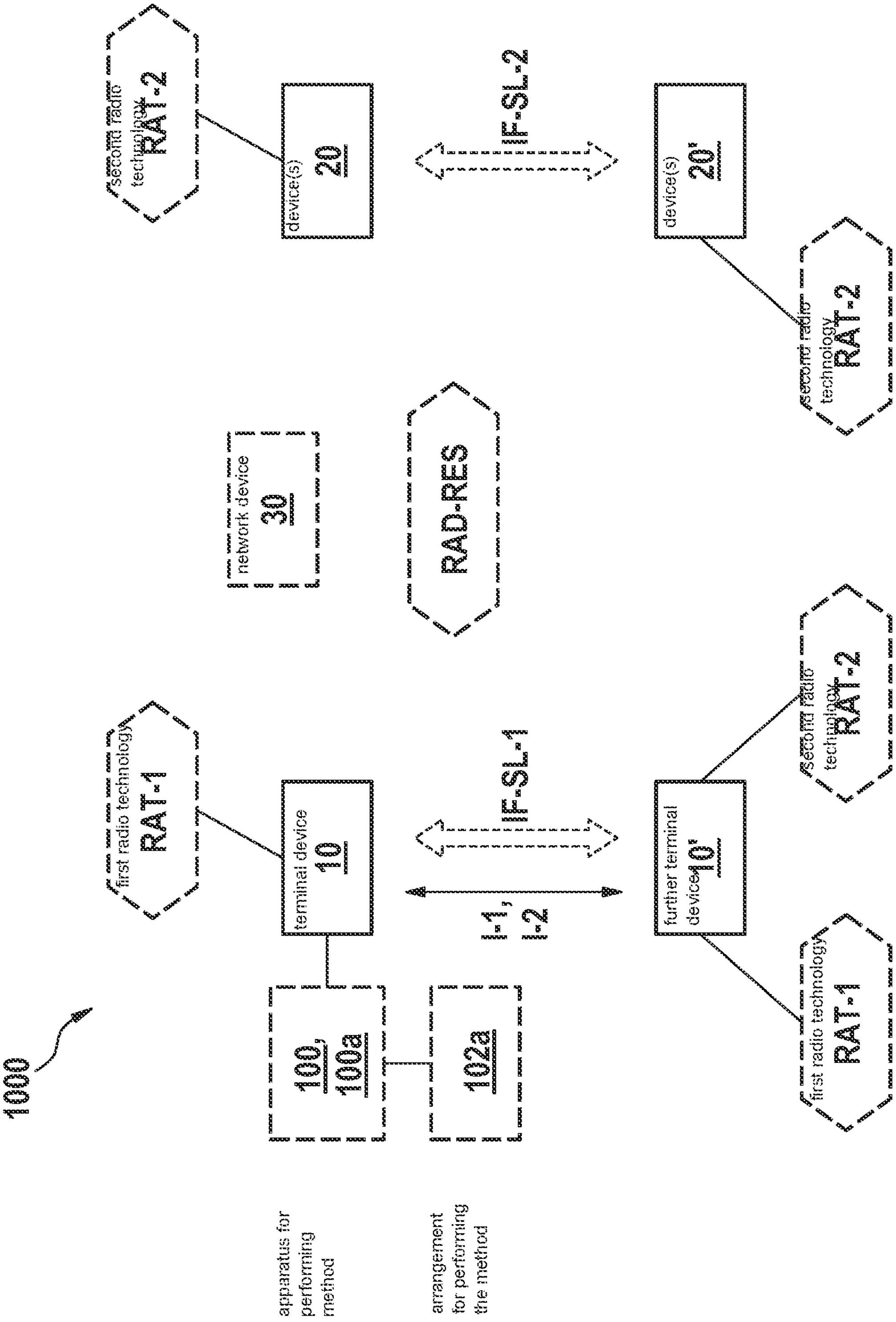
FIG. 2 schematically depicts a simplified block diagram according to exemplary embodiments of the present invention.

Exemplary embodiments, see for example FIG. 1, 2, relate to a method, for example a computer-implemented method, for processing data associated with a terminal device 10 (FIG. 2) configured to use at least a first radio technology, e.g. radio access technology, RAT-1, e.g. for communicating with at least one further terminal device 10', e.g. over a sidelink interface IF-SL-1 based on the first radio technology RAT-1, the method comprising: determining 300 (FIG. 1) a first parameter P1 characterizing an activity of devices 10, 10' configured to use, e.g. using (e.g., currently using), the first radio technology RAT-1 associated with predetermined radio resources RAD-RES, determining 302 a second parameter P2 characterizing an activity of devices 20, 20' configured to use, e.g. using (e.g., currently using), at least one of a) the first radio technology RAT-1, b) at least one further, e.g. second, radio technology, e.g. radio access technology, RAT-2, which is different from the first radio technology RAT-1, associated with the predetermined radio resources. In some exemplary embodiments, this e.g. enables to assess an activity of devices 10, 10', 20, 20' with respect to the predetermined radio resources RAD-RES, the devices e.g. being associated with the first radio technology RAT-1 and/or with the second radio technology RAT-2.

In some exemplary embodiments, the terminal device 10 and/or the at least one further terminal device 10' and/or at least one of the devices 20, 20' configured to use the first radio technology RAT-1 and/or the second radio technology RAT-2 can e.g. be used with a wireless, for example cellular, communications system or network 1000, which is for example based on and/or adheres at least partially to at least one third generation partnership project, 3GPP, radio standard such as 4G (fourth generation), 5G (fifth generation), 6G (sixth generation) or other radio access technology.

In some exemplary embodiments, the terminal device 10 and/or the at least one further terminal device 10' and/or at least one of the devices 20, 20' configured to use the first radio technology and/or the second radio technology may be a user equipment (UE) or a data transceiver modem, which, for example, may be associated with a mobile object such as e.g. a vehicle, for example car or truck or the like.

In some exemplary embodiments, the terminal device 10 and/or the at least one further terminal device 10' and/or at least one of the devices 20, 20' configured to use the first radio technology and/or the second radio technology may be at least one of: an IoT (Internet of Things) device, an infrastructure component or part of an infrastructure component (e.g., traffic lights, street lights, traffic sign, toll gate), an industrial automation component, e.g. IIoT (Industrial IoT) component or infrastructure (e.g., robots, machines, etc.), a device for a mobile broadband user, and/or a vehicle.

In some exemplary embodiments, the first radio technology RAT-1 is 5G NR V2X.

In some exemplary embodiments, the second radio technology RAT-2 is LTE V2X.

In some exemplary embodiments, the first radio technology RAT-1 is a, e.g. any, 3GPP C-V2X radio technology.

In some exemplary embodiments, the second radio technology RAT-2 is a, e.g. any, non-3GPP V2X radio technology.

In some exemplary embodiments, the devices 20, 20' are e.g. LTE V2X-capable terminal devices which may at least temporarily communicate with each other using a sidelink interface IF-SL-2 based on the second radio technology RAT-2.

In some exemplary embodiments, FIG. 2, the communication system or communication network 1000 may comprise at least one network device, e.g. base station, e.g. gNB 30, which is configured to at least temporarily serve at least one of the terminal devices 10,10'.

In some exemplary embodiments, FIG. 1, the method comprises: evaluating 304 the first parameter P1 and the second parameter P2, for example evaluating 304*a* the first parameter P1 with respect to the second parameter P1.

Figure 3:
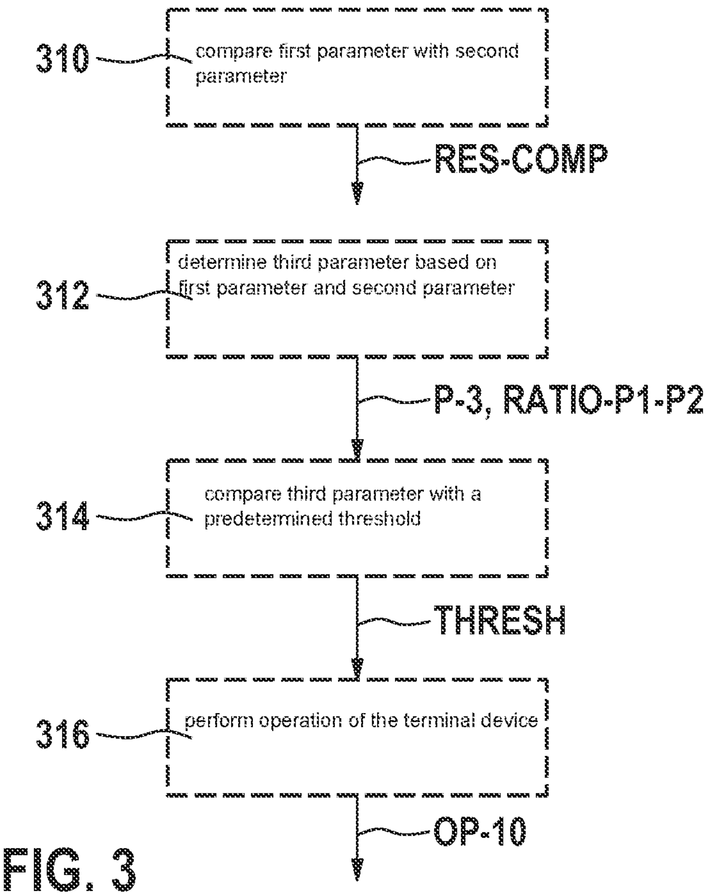
FIG. 3 schematically depicts a simplified flow-chart according to exemplary embodiments of the present invention.

In some exemplary embodiments, FIG. 3, the method comprises at least one of: a) comparing 310 the first parameter P1 with the second parameter P2, which may e.g. yield a result RES-COMP of the comparison 310, b) determining 312 a third parameter P3 based on the first parameter P1 and the second parameter P2, wherein for example the third parameter P3 is obtained as a ratio RATIO-P1-P2 of the first parameter and the second parameter, e.g. P3=P1/P2, c) comparing 314 the third parameter P3 with a, for example predetermined (e.g., configured and/or standardized), threshold THRESH, d) performing 316 an operation OP-10 of the terminal device 10 (FIG. 1), for example at least temporarily, based on at least one of: d1) the third parameter P3, d2) the comparison 314 of the third parameter P3 with the threshold THRESH, d3) the comparison 310 of the first parameter P1 with the second parameter P2 (e.g., the result RES-COMP).

Figure 4:
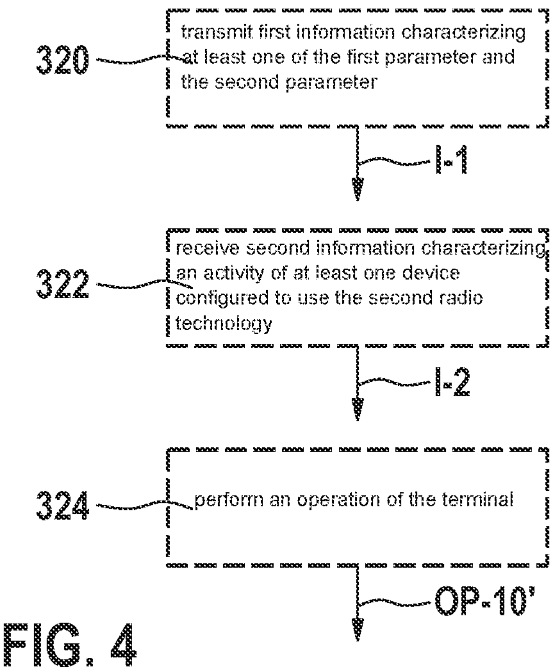
FIG. 4 schematically depicts a simplified flow-chart according to exemplary embodiments of the present invention.

In some exemplary embodiments, FIG. 4, the method comprises at least one of: a) transmitting 320, to at least one further device, e.g. terminal device 10', see FIG. 1, first information I-1 characterizing at least one of a1) the first parameter P1, a2) the second parameter P2, a3) the third parameter P3, a4) the result RES-COPM of the comparison 310, b) receiving 322, from at least one further device 10', second information 1-2 characterizing an activity of at least one device 20, 20' configured to use at least the second radio technology RAT-2, e.g. associated with the predetermined radio resources RAD-RES, c) performing 324 an operation OP-10' of the terminal device 10, for example at least temporarily, based on at least one of: c1) the first information I-1, c2) the second information I-2.

Figure 5:
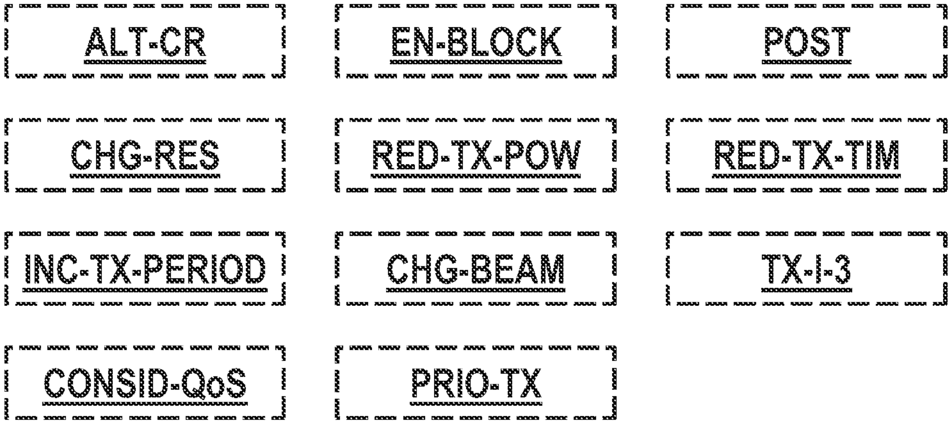
FIG. 5 schematically depicts a simplified block diagram according to exemplary embodiments of the present invention.

In some exemplary embodiments, FIG. 5, the performing 316, 324 of the operation OP-10, OP-10' of the terminal device 10 comprises at least one of: a) altering ALT-CR a channel occupancy ratio, b) enabling EN-BLOCK, e.g. direct, blocking, c) postponing POST at least one transmission) changing CHG-RES, e.g. reselecting, radio resources, e) reducing RED-TX-POW a transmit power, f) reducing RED-TX-TIM a transmission time, g) increasing INC-TX-PERIOD a transmission periodicity, h) change CHG-BEAM at least one radio beam, e.g. to avoid a direction of at least one device 20, 20' using the second radio technology RAT-2, i) transmit TX-I-3 third information based on at least one of the first information I-1 and the second information I-2, e.g. as inter-terminal device coordination information, e.g. to inform at least one further terminal device 10', e.g. using at least the first radio technology RAT-1, j) considering CONSID-QoS a quality of service, QoS, k) prioritizing PRIO-TX transmissions.

In some exemplary embodiments, the method comprises at least one of: a) a first radio technology RAT-1 to detect the activity of a second radio technology RAT-2 in a configured shared channel, b) using the first radio technology RAT-1, e.g. by a terminal device 10, to detect an activity of the second radio technology RAT-2 in a configured shared channel.

Further exemplary embodiments, FIG. 2, relate to an apparatus 100, for example for a terminal device 10, 10', for performing the method according to the embodiments.

Further exemplary embodiments, FIG. 2, relate to an apparatus 100*a*, for example for a terminal device 10, 10', comprising means 102*a*, for performing the method according to the embodiments.

In some exemplary embodiments, the apparatus 100, 100*a* and/or its functionality may e.g. be provided within the terminal device 10, 10'. In some exemplary embodiments, the apparatus 100, 100*a* and/or its functionality may e.g. be provided outside of the terminal device 10, 10', e.g. in form of a, for example separate, device, that may e.g. be at least temporarily coupled with the terminal device 10, 10'.

Further exemplary embodiments, FIG. 2, relate to a terminal device 10, 10' comprising at least one apparatus 100, 100*a* according to the embodiments.

Figure 6:
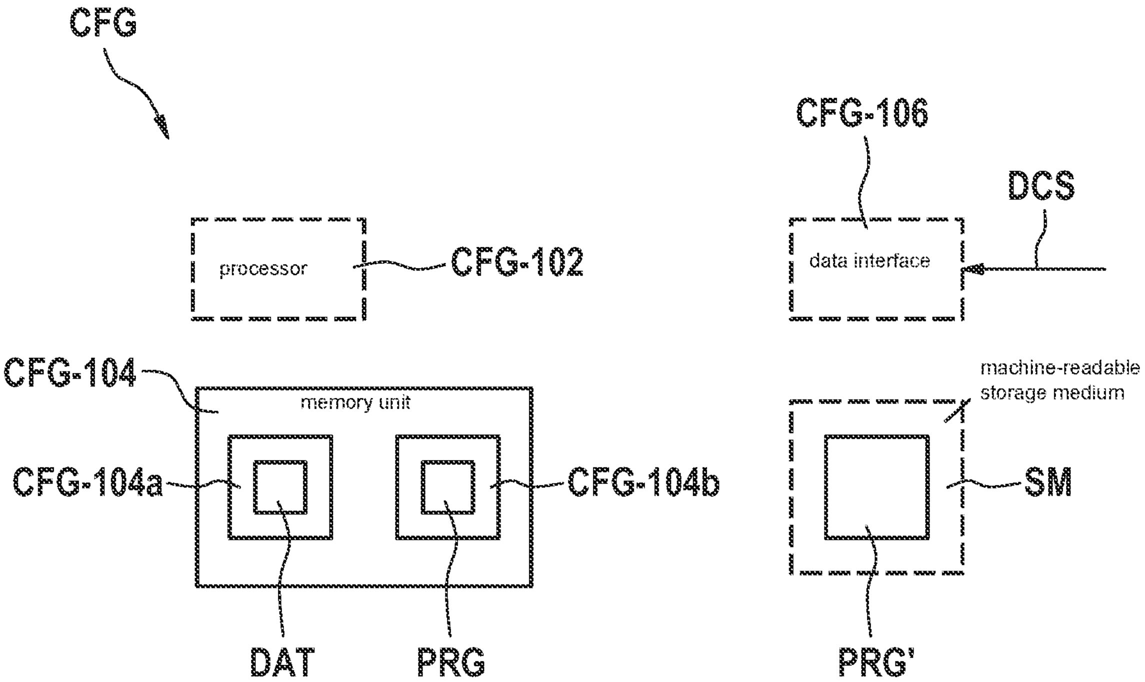
FIG. 6 schematically depicts a simplified block diagram according to exemplary embodiments of the present invention.

FIG. 6 schematically depicts a simplified block diagram of a configuration CFG according to further exemplary embodiments. In some exemplary embodiments, the depicted configuration CFG may e.g. be used for implementing at least one of the apparatus 100, 100*a* according to the embodiments.

In some exemplary embodiments, the configuration CFG comprises at least one calculating unit, e.g. processor, CFG-102 and at least one memory unit CFG-104 associated with (i.e., usably by) the at least one calculating unit CFG-102, e.g. for at least temporarily storing a computer program PRG and/or data DAT, wherein the computer program PRG is e.g. configured to at least temporarily control an operation of the configuration CFG, e.g. for (e.g., within) at least one apparatus 100, 100*a*, such as e.g. the execution of a method according to some exemplary embodiments.

In some exemplary embodiments, the at least one calculating unit CFG-102 comprises at least one core (not shown) for executing the computer program PRG or at least parts thereof, e.g. for executing the method according to the embodiments or at least one or more steps and/or other aspects thereof.

According to further exemplary embodiments, the at least one calculating unit CFG-102 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor, a graphics processing unit (GPU). According to further preferred embodiments, any combination of two or more of these elements is also possible.

According to further exemplary embodiments, the memory unit CFG-104 comprises at least one of the following elements: a volatile memory CFG-104*a*, e.g. a random-access memory (RAM), a non-volatile memory CFG-104*b*, e.g. a Flash-EEPROM.

In some exemplary embodiments, the computer program PRG is at least temporarily stored in the non-volatile memory CFG-104*b*. Data CFG-DAT (e.g. associated with at least one of a) the first parameter P1, b) the second parameter P2, c) the third parameter P3, d) the first information I-1, e) the second information I-2, and the like), which may e.g. be used for executing the method according to some exemplary embodiments, may at least temporarily be stored in the RAM CFG-104*a*.

In some exemplary embodiments, an optional computer-readable storage medium SM comprising instructions, e.g. in the form of a further computer program PRG', may be provided, wherein the further computer program PRG', when executed by a computer, i.e. by the calculating unit CFG-102, may cause the computer CFG-102 to carry out the method according to the embodiments. As an example, the storage medium SM may comprise or represent a digital storage medium such as a semiconductor memory device (e.g., solid state drive, SSD) and/or a magnetic storage medium such as a disk or hard disk drive (HDD) and/or an optical storage medium such as a compact disc (CD) or DVD (digital versatile disc) or the like.

In some exemplary embodiments, the configuration CFG may comprise an optional data interface CFG-106, e.g. for bidirectional data exchange with an external device (not shown). As an example, by means of the data interface CFG-106, a data carrier signal DCS may be received, e.g. from the external device, for example via a wired or a wireless data transmission medium, e.g. over a (virtual) private computer network and/or a public computer network such as e.g. the Internet.

In some exemplary embodiments, the data carrier signal DCS may represent or carry the computer program PRG, PRG' according to the embodiments, or at least a part thereof.

Further exemplary embodiments relate to a computer program PRG, PRG' comprising instructions which, when the program is executed by a computer CFG-102, cause the computer CFG-102 to carry out the method according to the embodiments.

In the following, further aspects and advantages according to further exemplary embodiments are provided, which, in some exemplary embodiments, may be combined with each other and/or with at least one of the exemplary aspects explained above.

In some exemplary embodiments, the principle according to the embodiments can e.g. be used to address, e.g. mitigate, at least some of the following aspects:

Aspect 1: In some exemplary embodiments, a conventional terminal device, e.g. "Type B" device according to some accepted standard or according to some conventional disclosure, e.g. as defined by 3GPP R1-2205588, "FL Summary for AI 9.4.2-Co-Channel Coexistence for LTE and NR Sidelink," Moderator: Fraunhofer HHI, RANI Meeting #109-e, May, 2022, cannot decode sidelink (SL) control information associated with e.g. the second radio technology RAT-2 (e.g., LTE-V2X) and can, for example, not make sensing-based decisions based on the activity associated with the second radio technology RAT-2. In some exemplary embodiments, a "Type B" device may e.g. be a terminal device with, for example only, one or more NR SL modules (e.g., based on a self-sufficient mechanism embedded in an NR-SL modem), wherein the "Type B" device may e.g. use the first radio technology, e.g. according to 5G NR, e.g. 5G NR V2X, wherein, for example, the "Type B" device may e.g. not be able to use the second radio technology, e.g. LTE V2X. In some exemplary embodiments, such "Type B" device may e.g. be enhanced by adding the functionality according to some exemplary embodiments, see terminal device 10 of FIG. 2, which, in some exemplary embodiments enables the terminal device 10 to e.g. consider an activity of the further terminal devices 20, 20' (FIG. 2).

Aspect 2: In some exemplary embodiments, e.g. if a "Type B" device or a terminal device based on a Type B device determines, e.g. predicts, an activity of the devices 20, 20' associated with the second radio technology RAT-2, in some exemplary embodiments, the information related to the activity may e.g. be used to alter an SL resource selection of the terminal device 10, e.g. in order to vacate a radio channel for the second radio technology RAT-2.

Aspect 3: In some exemplary embodiments, a terminal device 10 may be enhanced, e.g. if there is an existing second device, e.g. configured to use the second radio technology RAT-2, the second device e.g. being capable of sharing information, e.g. activity-related information associated with the second radio technology RAT-2, as may e.g. be obtained by applying at least one sensing procedure associated with the second radio technology RAT-2, e.g. with the terminal device 10, e.g. to optimize a coexistence of the devices 10, 10', 20, 20'.

In some exemplary embodiments, a procedure for enabling and/or improving coexisting direct communication technology 1, e.g. sidelink communication based on the first radio technology RAT-1, and technology 2, e.g. sidelink communication based on the second radio technology RAT-2, e.g. in same (or similar, e.g. at least partly overlapping (e.g. in a time and/or frequency dimension)) radio resources RAD-RES (FIG. 2), such as e.g. a same channel/co-channel, may be provided using the principle according to some exemplary embodiments.

In some exemplary embodiments, the principle according to some exemplary embodiments enables to provide a procedure, e.g. solution, to allow sidelink coexistence of different radio technologies RAT-1, RAT-2, e.g. with minimum specification impacts.

In some exemplary embodiments, the principle according to some exemplary embodiments enables to enhance existing terminal devices, e.g. 5G NR compatible terminal devices (e.g., NR-V2X module), e.g. if a second device (e.g., capable of another radio technology (e.g., LTE-V2X module)) is provided, which may e.g. coexist on a same board with the 5G NR terminal device, enabling these devices e.g. to share activity-related information associated with the respective radio technology RAT-1, RAT-2, as may e.g. be obtained by the respective device, e.g. by applying at least one sensing procedure associated with the respective radio technology RAT-1, RAT-2.

In some exemplary embodiments, a solution for detecting and/or predicting, e.g. by the terminal device 10 configured to use the first radio technology RAT-1, activities of at least one other technology, e.g. the second radio technology RAT-2, e.g. of devices 20, 20' associated with the at least one other technology RAT-2, is provided. In some exemplary embodiments, the terminal device 10 may e.g. decode information related to the first radio technology RAT-1, while the terminal device 10 may e.g. not be able to decode information related to the second radio technology RAT-2.

In some exemplary embodiments, a scale, e.g. coexistence scale or parameter, e.g. the third parameter P3, is proposed, which may e.g. be determined based on a ratio of the first parameter P1, e.g. a "decodable scale" associated with the first radio technology, e.g. associated with resources (e.g., those of the predetermined radio resources RAD-RES) occupied by the first radio technology RAT-1 (e.g., "occupied resource ratio") and a second parameter P2, e.g. characterizing an absolute activity in the predetermined radio resources RAD-RES, e.g. a shared channel, e.g. based on energy-based detection (e.g., a value of busy ratio). In other words, in some exemplary embodiments, the determination of the second parameter does not involve any decoding, but may e.g. be based on a determination of, for example, a received signal energy, associated with the predetermined radio resources RAD-RES.

In some exemplary embodiments, the third parameter P3 may e.g. be considered as a scale, e.g. a "coexistence scale x", e.g. according to:

$$\text{coexistence scale}x=P1/P2.$$

In some exemplary embodiments, the first parameter P1 may be considered to characterize an "activity sidelink slot occupancy ratio" associated with the first radio technology RAT-1, and the second parameter P2 may be considered to characterize, e.g. accumulated, activities of devices associated with the first radio technology RAT-1 and/or the second radio technology RAT-2, e.g. based on energy based channel busyness, e.g. within the predetermined radio resources RAD-RES.

In some exemplary embodiments, a coexistence of the terminal devices 10, 20 may be enabled or improved, e.g. by altering, for example, transmission (TX) parameters of at least one of the terminal devices 10, 20, e.g. based on at least one of the following elements: P1, P2, P3

In some exemplary embodiments, a solution may be provided, e.g. to enhance a coexistence, e.g. based on sharing possible temporal (time-frequency/periodicity) information and/or additional information, e.g., related to priorities, of the occupied/reserved resources by e.g. the second radio technology RAT-2, e.g. from a, for example collocated, device 20 configured to use the second radio technology.

In some exemplary embodiments, for example novel, device types, e.g. types of terminal devices, may be provided based on the principle according to the embodiments, e.g. with respect to the device types exemplarily disclosed by 3GPP R1-2205588, "FL Summary for AI 9.4.2-Co-Channel Coexistence for LTE and NR Sidelink," Moderator: Fraunhofer HHI, RANI Meeting #109-e, May, 2022, which, in some exemplary embodiments, may e.g. result in at least one, for example new, device type (e.g., Type A+Type B, enhanced Type B, Type B assisted by Device 2, Type C, etc.).

In some exemplary embodiments, at least one procedure and/or mechanism may be provided for terminal device, e.g. for Type B devices (e.g., equipped with a radio technology RAT-1-capable, e.g. (for example only) NR-V2X sidelink module), e.g. to detect and/or predict activities of devices 20, 20' capable of using at least one other radio technology, e.g. the second radio technology RAT-2, such as e.g., LTE-V2X sidelink transmission), e.g. within the predetermined radio resources RAD-RES (FIG. 2), e.g. on a certain, e.g. shared, channel and/or carrier and/or resource pool and/or the like, e.g. based on, for example internal, measurements and/or comparison, e.g., without the terminal device to be able to decode signals of the second radio technology RAT-2.

In some exemplary embodiments, a coexistence scale, e.g. in form of or at least similar to the third parameter P3, e.g. based on comparing resource reservations (e.g., in some exemplary embodiments identical or at least similar to the first parameter P1) to energy-based detection (e.g., in some exemplary embodiments identical or at least similar to the second parameter P2), may be provided In some exemplary embodiments, a procedure may be provided to compare sensing measurements (e.g. based on decoding sidelink control information (SCI), e.g. associated with the sidelink interface IF-SL-1 (FIG. 2)) and an amount of occupied/reserved resources of radio technology RAT-1 to energy detected activity of radio technology RAT-1 and at least one other radio technology, e.g., radio technology RAT-2.

In some exemplary embodiments, at least some aspects of a procedure according to exemplary embodiments may e.g. be specified in at least one of: a) physical layer specification, b) physical layer measurements, c) physical layer procedure.

In some exemplary embodiments, one example of a coexistence scale, e.g. in the sense of the third parameter P3 explained above, is to divide a ratio or amount, respectively, of radio technology RAT-1 activity by a ratio or amount, respectively, of radio technology RAT-1 activity plus, for example all, other radio technology activities, e.g. of RAT-2, e.g. within the predetermined radio resources RAD-RES.

In some exemplary embodiments ("ASPECT I"), it is proposed, e.g. first, to find radio technology RAT-1 associated activity, e.g. a sidelink slot occupancy ratio, e.g. by performing the following steps a., b.:

a. find a number of resources occupied by radio technology RAT-1, e.g. by similar UEs 10' in the system 1000 (e.g. as detected/decoded by a radio technology RAT-1 capable receiver, e.g. of the terminal device 10), i.e., ("Technology 1 activity sidelink slot occupancy ratio"),
b. divide the number as obtained by step a. by a total number of slots in the past M1 many slots.

In some exemplary embodiments ("ASPECT II"), it is proposed, e.g. secondly, to find, e.g. determine, a ratio of occupied resources by one or all radio technologies, e.g. by performing the following steps:

a. determine a total number of slots detected as being occupied (e.g., either by radio technology 1 and/or by radio technology 2/3/ . . . n),
b. divide the number of resources occupied by radio technology RAT-1 (e.g., as determined in step a. of "ASPECT I" mentioned above) by the total number of slots in the past M2 many slots, In some exemplary embodiments ("ASPECT III"), it is proposed, e.g. thirdly, to determine the coexistence scale by dividing a result of ASPECT I. by the result of ASPECT II.

In some exemplary embodiments, the coexistence scale may e.g. be the result of dividing ASPECT I).a)/ASPECT II).a), e.g. if M1=M2=M previous slots.

In some exemplary embodiments, e.g. to determine, e.g. compute, the occupancy of any radio technology RAT-1, RAT-2, . . . in previous M many slots, it is possible to consider the slots with energy detected and/or with, e.g. SL-RSSI (sidelink received signal strength indicator)-based measurements, e.g. exceeding a certain SL-RSSI-coexistence-threshold, divided by a number of slots configured in the previous M many slots (e.g., in some exemplary embodiments similar to CBR, e.g. indicating a ratio of activity of radio technology RAT-2+radio technology RAT-1).

In some exemplary embodiments, e.g. to evaluate (see, for example, block 304*a*) a coexistence scale/ratio, the following exemplary equation is proposed:

coexistence scale x=(radio technology RAT-1 activity sidelink slot occupancy ratio)/(radio technology RAT-1+ radio technology RAT-2 activities, e.g. based on energy based channel business) [equation 1].

In some exemplary embodiments, the resultant coexistence scale x should be, for example always, smaller than 1 (or smaller than 100%).

In some exemplary embodiments, a ratio value of x near to zero (or 0%) may e.g. indicate more population and/or activity of devices 20, 20' (FIG. 2) operating the second radio technology RAT-2. In this case, in some exemplary embodiments, vacating the channel, by the terminal device 10, e.g. for the second radio technology RAT-2 may be beneficial. In other words, some exemplary embodiments propose: determining, e.g. by the apparatus 100, 100*a* and/or the terminal device 10, whether the third parameter P3 and/or the coexistence scale x is less than a predetermined first threshold, and vacating, e.g. by the apparatus 100, 100*a* and/or the terminal device 10, the predetermined radio resources RAD-RES, e.g. to enable other devices 20, 20' to used the respective resources, e.g. without interference caused by the terminal device 10, e.g. using the first radio technology RAT-1.

In some exemplary embodiments, a ratio value of x close to 1 (100%) may e.g. indicate more population and/or activity of devices 10' with the same, e.g. first, radio technology RAT-1, e.g. as the terminal device 10.

In some exemplary embodiments, a decision, e.g. "coexistence decision" or "coexistence-related decision", e.g. based on at least one of the computed coexistence scale x and the third parameter P3 is proposed.

In some exemplary embodiments, a, for example quasi-static, coexistence mechanism is developed in a form of coexistence decision, e.g., in order to allow a coexistence of the first radio technology RAT-1 (e.g., NR V2X sidelink) with at least one other radio technology, e.g., the second radio technology RAT-2 (e.g., LTE-V2X), e.g. within the (e.g., same) predetermined radio resources RAD-RES (FIG. 2), as e.g. characterized by at least one of, e.g. same, a) carrier, b) channel, c) frequency/frequencies, d) resource-pool, e) etc.

In some exemplary embodiments, the coexistence decision is based on a coexistence scale/coexistence threshold, which may e.g. be used to alter certain transmission (TX) parameters, wherein, for example, a decision on TX resources/resource selection and/or reservation of radio technology RAT-1 may e.g. be performed by Type B devices.

In some exemplary embodiments, the coexistence decision may be, e.g., altering channel occupancy ratio (CR), allowing direct blocking or postponing transmission ratio (e.g. by implementation), reselection of another resource pool/channel [e.g., if multiple channel operation/multiple carrier operation is allowed], etc.).

In some exemplary embodiments, the altering process may consider, e.g. within a time scale (e.g. lower/upper limit) of e.g. X many units, where X is e.g. in msec (milliseconds) and/or number of physical or logical slots (e.g., per resource pool), for which a specific channel is left to another radio technology.

In some exemplary embodiments, X can e.g. be (pre-) configured (or standardized) and may e.g. consider a UE sidelink module capability.

In some exemplary embodiments, e.g., an ON/OFF pattern, e.g. radio technology RAT-1 (e.g., NR Sidelink) transmission (or any altering of the transmission procedure of radio technology RAT-1) may e.g. be selected based on, e.g., the coexistence scale and/or the third parameter P3.

In some exemplary embodiments, the coexistence scale x may e.g. be a scale or value, e.g. (pre-)configured, with a value range from 0-1 in, e.g., RRC (radio resource control) (pre-) configurations.

In some exemplary embodiments, the coexistence scale of values>0 means comparatively higher activity of the "foreign" technology, e.g. the second radio technology RAT-2, e.g. as seen from the terminal device 10, or vice versa.

In some exemplary embodiments, a coexistence scale of values>a (pre-configured) coexistence threshold may e.g. imply a decision, e.g. to impact the operation of the terminal device 10 using the first radio technology RAT-1.

In some exemplary embodiments, a coexistence-threshold (pre-) configured in RRC specification may e.g. induce an indication for a procedure, e.g. to alter TX transmission and/or TX parameters, e.g. in a physical layer procedure and/or altering resource selection, e.g. in a MAC procedure.

In some exemplary embodiments, different threshold values and their altering mechanisms (e.g., characterizing when to use which specific threshold value) may e.g. be listed in a lookup table, e.g. in radio access specifications.

Figure 7:
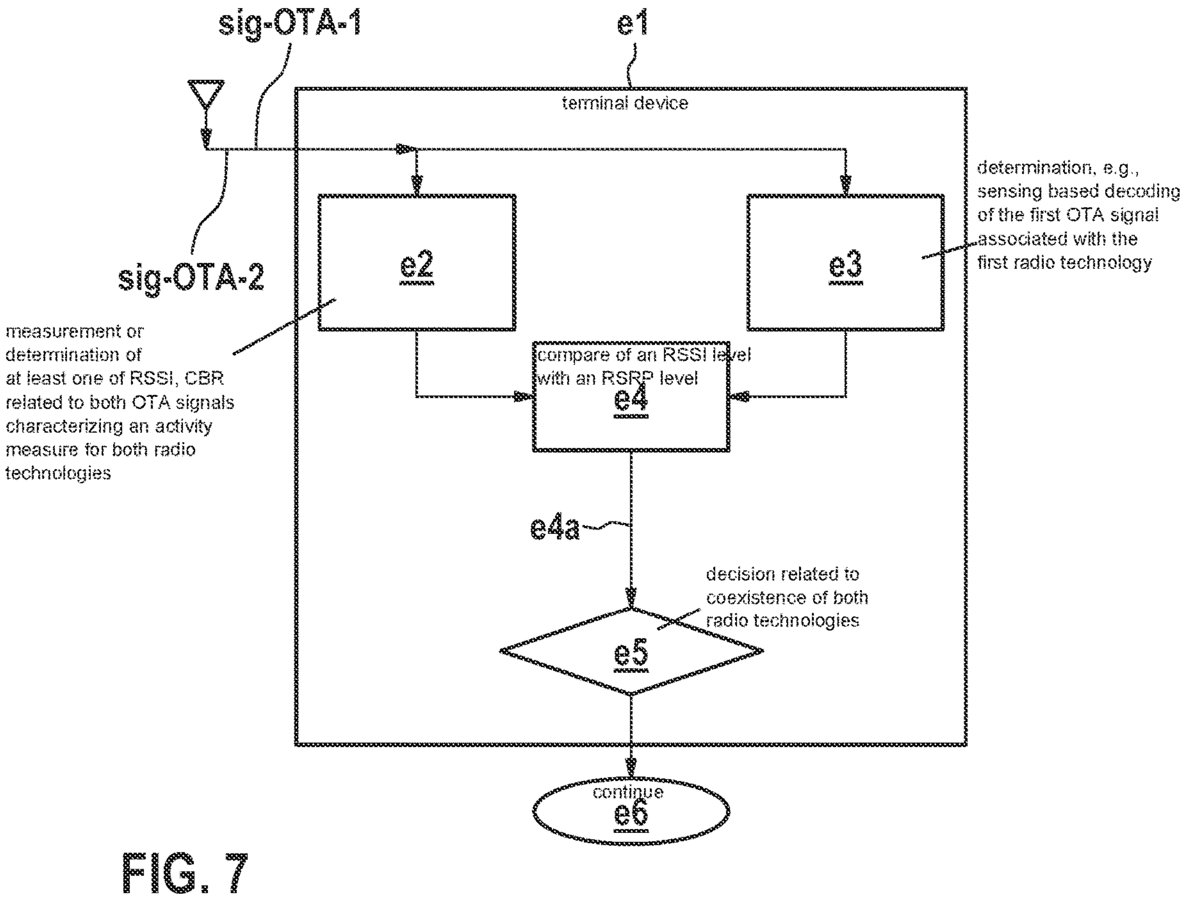
FIG. 7 schematically depicts a simplified block diagram according to exemplary embodiments of the present invention.

FIG. 7 schematically depicts a simplified flow-chart according to exemplary embodiments. Element e1 symbolizes a terminal device, wherein an over-the-air (OTA) signal energy strength associated with OTA signals sig-OTA-1, sig-OTA-2 e.g. associated with respective radio technologies RAT-1, RAT-2 is analyzed and measured, e.g. for at least some, for example all (presently for example two), radio technologies RAT-1, RAT-2 occupying the predetermined radio resources RAD-RES, as e.g. characterized by at least one of: a shared channel/a shared resource pool/a shared carrier.

Element e2 symbolizes exemplary measurements or a determination of at least one of RSSI, CBR related to both OTA signals sig-OTA-1, sig-OTA-2, characterizing an activity measure for both radio technologies RAT-1, RAT-2.

Element e3 symbolizes an exemplary determination, e.g. sensing based decoding (e.g., RSRP), of the first OTA signal sig-OTA-1 associated with the first radio technology RAT-1, characterizing an activity measure for the first radio technology RAT-1.

Element e4 symbolizes a comparison, e.g. of an RSSI level as obtained by element e2 with an RSRP level as obtained by element e3. Alternatively, in some exemplary embodiments, element e4 may determine a number of decodable frames.

Element e5 symbolizes a decision related to coexistence of both radio technologies RAT-1, RAT-2 based on the output of element e4, which, in some exemplary embodiments may be denoted as "blocking scale".

In some exemplary embodiments, element e2 may determine, e.g. compute an RSSI, e.g. as measured for all activities of all possible technologies RAT-1, RAT-2, e.g. in the past M many slots.

In some exemplary embodiments, element e3 may determine activity related to the first radio technology RAT-1, e.g. using sensing base/decoding of the respective M past slots, which in some exemplary embodiments may e.g. be preconfigured, e.g. for coexistence measurements.

In some exemplary embodiments, a blocking scale/coexistence scale e4a is determined by element e4 which can e.g. be compared to a coexistence threshold by element e5.

In some exemplary embodiments, the coexistence decision of element e5 may e.g. impact N many future slots, where N can e.g. be pre-configured, e.g. in RRC specifications.

In some exemplary embodiments, a, for example quasi-static, pattern, e.g. ON/OFF pattern, e.g. for usage of TX resources may be determined by element e5, e.g. for at least temporarily vacating the radio resources RAD-RES, e.g. to enable, e.g. improve, a coexistence of both radio technologies RAT-1, RAT-2.

In some exemplary embodiments, element e6 symbolizes a continuation of the procedure.

Figure 8:
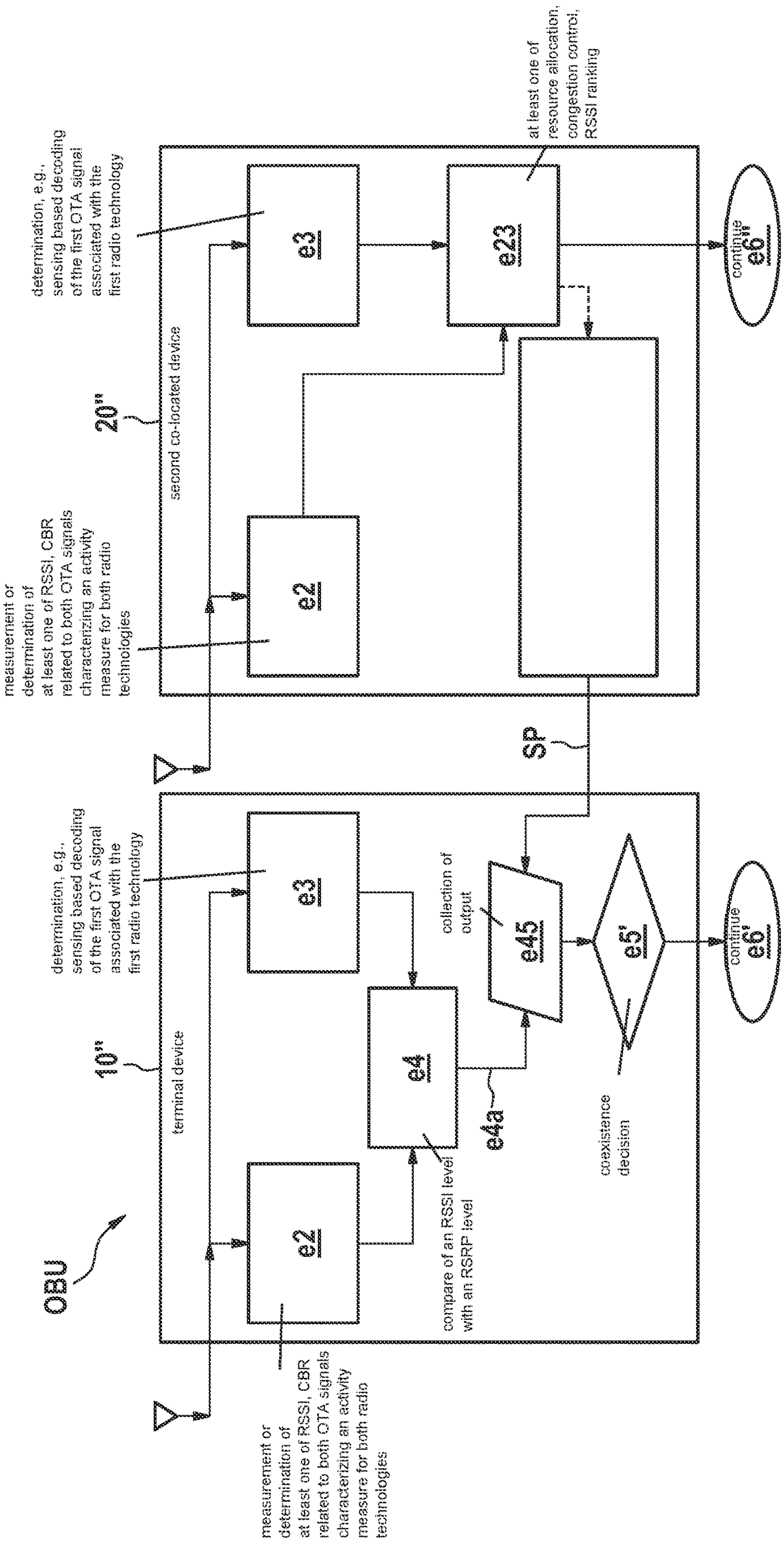
FIG. 8 schematically depicts a simplified block diagram according to exemplary embodiments of the present invention.

FIG. 8 schematically depicts a simplified flow-chart according to exemplary embodiments, wherein an operation of the terminal device 10" may e.g. be enhanced, e.g. by utilizing second, e.g. co-located device 20", e.g. using an exemplary in device-coexistence mechanism (e.g., if considered), wherein, for example, the device 20" is able, e.g. configured, to decode e.g. specific control channel and reservations of a the second radio technology RAT-2.

In some exemplary embodiments, an optional signal path SP, e.g. from device 20" to device 10", is provided, e.g. for sharing, e.g. timely, sensing information and/or other e.g. (pre-) configured information.

In some exemplary embodiments, the information received at device 10" over the signal path SP may e.g. be considered by device 10", e.g. by the coexistence decision e5'. Element e45 symbolizes an optional collection of the output e4a of element e4 of FIG. 8 and of the information received via the signal path SP, e.g. providing the respective collected information to the coexistence decision e5'.

In some exemplary embodiments, a decision made by block e5', e.g. based on the coexistence scale, may e.g. be enhanced by considering the (optionally) shared information from the signal path SP.

In some exemplary embodiments, elements e6', e6" of FIG. 8 symbolize a respective continuation of an operation of the devices 10", 20".

In some exemplary embodiments, element e23 of FIG. 8 symbolizes aspects of at least one of: a) resource allocation, b) congestion control, c) RSSI ranking (or non-ranking), e.g. based on resource reservations.

In some exemplary embodiments, one or more of the following aspects may be considered, e.g. for an implementation, e.g. of the device 20": a) temporal sensing results including time/frequency/periodicity of sensing information (e.g., RSSI-ranked or not), b) radio technology RAT-2 CR (optional for in-device coexistence), c) measured CBR (optional for comparison), d) resource pool (pre-) configurations: e.g., (pre-)configured periodicities, re-transmission, etc., wherein the consideration may e.g. be based on an output of element e23.

Figure 9:
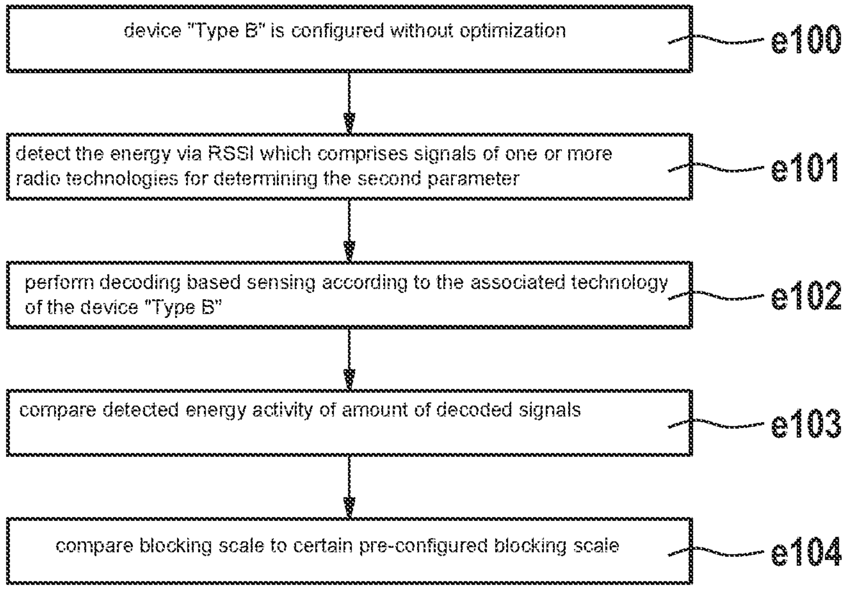
FIG. 9 schematically depicts a simplified flow-chart according to exemplary embodiments of the present invention.

FIG. 9 schematically depicts a simplified flow-chart according to exemplary embodiments.

Element e100 symbolizes that a device "Type B" is configured, e.g. without optimization (e.g., no Device Type B-option). Element e101 symbolizes detecting the energy via, e.g., RSSI, which comprises signals of one or more radio technologies RAT-1, RAT-2, e.g. for determining the second parameter P2 (see also, for example, block 302 of FIG. 1). Element e102 symbolizes performing decoding based sensing according to the associated technology of the device Type B (e.g., radio technology RAT-1), e.g. for determining the first parameter P1 (see also, for example, block 300 of FIG. 1). Element e103 symbolizes comparing the detected energy activity (of element e101) to the amount of decoded signals (resource reservations) of the associated technology (see element e102 2) and determining, e.g. computing, a certain blocking scale (e.g., from 0 to 1). Element e104 symbolizes comparing the blocking scale (of element e103) to a certain (pre-)configured blocking threshold; where accordingly the activity of Device Type B (with RAT-1) may e.g. be altered, e.g., blocked/allowed.

Figure 10:
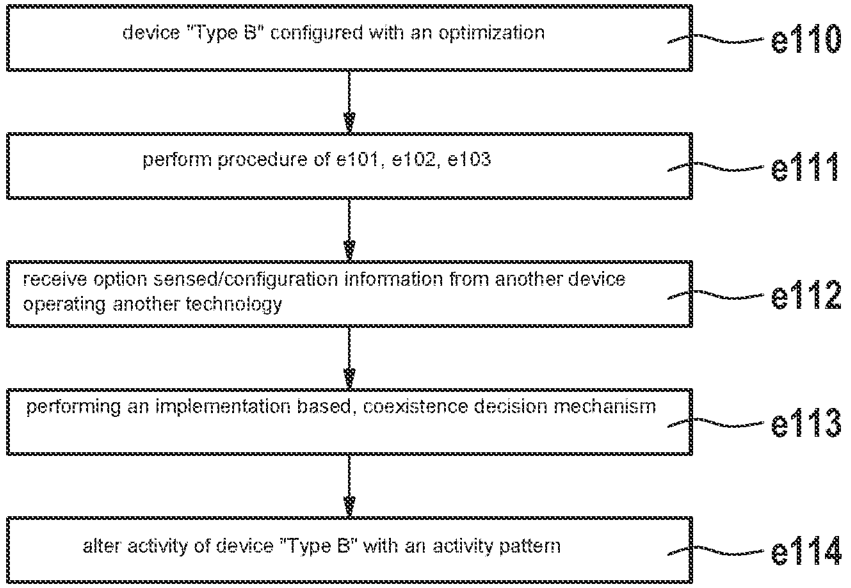
FIG. 10 schematically depicts a simplified flow-chart according to exemplary embodiments of the present invention.

FIG. 10 schematically depicts a simplified flow-chart according to exemplary embodiments.

Element e110 symbolizes a device Type B being configured with an optimization, e.g. by sharing sensing information/configuration from another device (Type A-like), see, for example the signal path SP of FIG. 8. Element e111 symbolizes performing a procedure as e.g. explained with respect to elements e101, e102, e103 of FIG. 9. Element e112 symbolizes receiving an optional sensed/configuration information from another device operating another technology (e.g., radio technology RAT-22), e.g. via the signal path SP of FIG. 8. Element e113 symbolizes performing an, for example implementation based, coexistence decision mechanism, e.g. based on at least one of: blocking scale, temporal sensing information from the another device (e.g., device 20" of FIG. 8), periodicity of radio technology RAT-2 activity/inactivity, etc. Element e114 symbolizes, e.g. based on the decision of element e113, to alter the activity of Device Type B (e.g. device 10" of FIG. 8, e.g. with RAT-1) with, e.g., an activity pattern (e.g., ON/OFF, Periodicity with a certain duration of activity, etc.).

Figure 11:
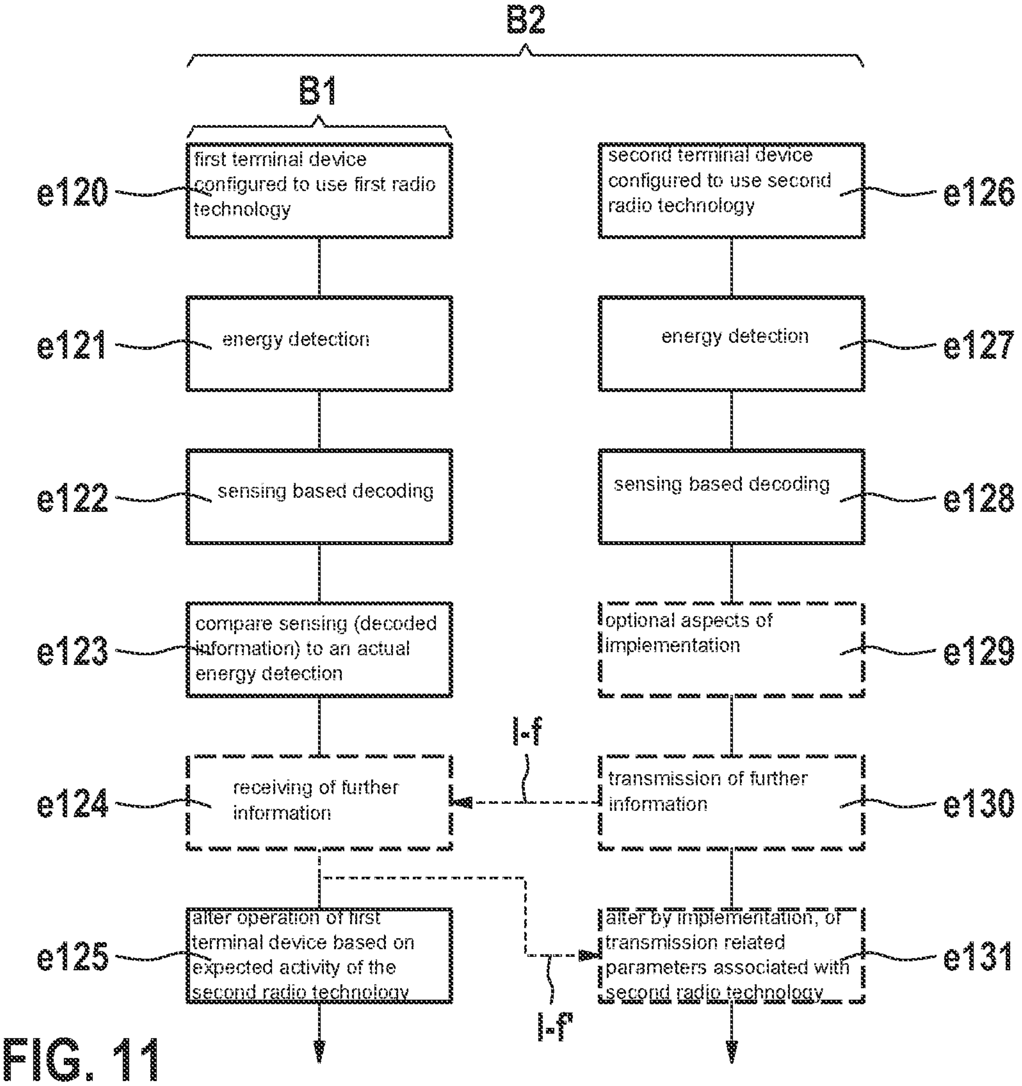
FIG. 11 schematically depicts a simplified flow-chart according to exemplary embodiments of the present invention.

FIG. 11 schematically depicts a simplified flow-chart according to exemplary embodiments. Bracket B1 symbolizes a terminal device or type of terminal device, e.g. a Type B device, as may e.g. be enhanced by the principle according to some exemplary embodiments. Bracket B2 symbolizes an optimized, e.g. new, type of terminal device, which may e.g. be obtained based on the principle according to some exemplary embodiments.

Element e120 symbolizes a first terminal device, e.g. terminal device 10 as exemplarily depicted by FIG. 2, configured to use the first radio technology RAT-1. Element e121 symbolizes an energy detection, e.g. based on RSSI or the like. Element e122 symbolizes a sensing based decoding. Element e123 symbolizes a comparison of a sensing (decoded information) to an actual energy detection (e.g., comparison to a threshold). Element e124 symbolizes an optional receiving of further Information I-f, e.g. further sensing information, e.g. from a further terminal device and/or an optional transmitting of further Information I-f', e.g. further sensing information, e.g. to the further terminal device. Element e125 symbolizes an altering of an operation of the first terminal device 10, e.g. based on an expected, e.g. determined, activity, e.g. of the second radio technology RAT-2.

Element e126 symbolizes a second terminal device, e.g. terminal device 20 as exemplarily depicted by FIG. 2, configured to use the second radio technology RAT-2. Element e127 symbolizes an energy detection, e.g. based on RSSI or the like, e.g. for an RSSI ranking. Element e128 symbolizes a sensing based decoding. Element e129 symbolizes optional aspects, e.g. of implementation, e.g. related to at least one of: Preparing sensing (e.g., temporal) information and/or (pre-) configuration/resource pool information/etc. Element e130 symbolizes an optional transmission of the further information I-f, e.g. assisting sensing information. Element e131 symbolizes an optional altering, e.g. if possible, e.g. by implementation, of transmission related parameters associated with the second radio technology RAT-2, e.g., inter alia, based on the further information I-f' from element e124.

In some exemplary embodiments, FIG. 11 depicts a possible sequence chart with an additional optional coexistence assistance, i.e., directed from the second terminal device 20 to the first terminal device 10, e.g. to enhance a coexistence, e.g. driven by the first device 10.

In some exemplary embodiments, e.g. additionally, an optional coexistence mechanism assistance from device 10 to device 20 is proposed for implementation purpose (e.g., as a kind of SOC enhancements), see the further information I-f'. In some exemplary embodiments, in the latter, it is also possible to alter the second device 20, e.g. based on a coexistence decision of the first device 10.

In some exemplary embodiments, it is proposed to enhance a coexistence decision according to exemplary embodiments, e.g. based on co-located devices 10, 10' (e.g., characterizing a, for example new, type of devices solution).

In some exemplary embodiments, an enhancement to e.g. a type B coexistence mechanism, is presented, which aims at exploiting sensing information that may e.g. be shared, and may e.g. be sent, e.g. by a co-located further device 20 (e.g., a co-located LTE-V2X sidelink module with the NR V2X sidelink module of the terminal device 10), e.g. to improve, e.g. optimize results of e.g. one of the above explained exemplary embodiments, e.g. with more granular information.

In some exemplary embodiments, in other words, two devices 10", 20" may be assumed to be co-located, e.g. on a same V2X on-board unit (OBU), see for example element OBU of FIG. 8.

In some exemplary embodiments, FIG. 8, the device 20" may, e.g. based on its own implementation, comprise at least one internal path, e.g. to share some, e.g. timely, information, e.g. to assist coexistence scenarios. In some exemplary embodiments, the, e.g. timely and/or instantaneous and/or quasi-instantaneous temporal (e.g., represented in time, frequency, and/or periodicity) information, may comprise at least one of:

- Sharing information about some slots reserved or already used by radio technology RAT-2 UEs/devices (e.g., as detected and/or decoded by Device 2 in past M-slots), Priorities of the occupied resources,
- CR of Device 2 (based on its past and future transmission, i.e., for in-device coexistence),
- Measured CBR (optional for comparison),
- Resource pool (pre-)configurations, (pre-)configured periodicities, re-transmission, etc.

Further exemplary embodiments, FIG. 8, relate to an apparatus, e.g. an on board unit OBU comprising at least two, e.g. collocated, apparatus and/or at least two terminal devices 10", 20" according to the embodiments, e.g. a first terminal device 10" according to the embodiments and a second terminal device 20" according to the embodiments. In some exemplary embodiments, the first terminal device 10" may e.g. be configured to use the first radio technology RAT-1, e.g. 5G NR V2X. In some exemplary embodiments, the second terminal device 20" may e.g. be configured to use the second radio technology RAT-2, e.g. LTE V2X. In some exemplary embodiments, the first terminal device 10" and the second terminal device 20" may be configured to at least temporarily exchange information, e.g. via path SP, characterizing an activity of devices configured to use, e.g. using, the first radio technology RAT-1 associated with the predetermined radio resources RAD-RES (FIG. 2) and/or information characterizing an activity of devices configured to use, e.g. using, the second radio technology RAT-2 associated with the predetermined radio resources RAD-RES.

Further exemplary embodiments, FIG. 2, relate to a communication system or communication network 1000 comprising at least one apparatus 100, **100*a* and/or at least one terminal device 10, 10', 20, 20'** according to the embodiments.

Further exemplary embodiments relate to an optimization, e.g. regarding a received SINR and/or SL RSSI level. In some exemplary embodiments, e.g. regarding type B devices and referring to at least some of the above explained embodiments, an inability to decode a signal, e.g. by the terminal device 10, can be due to a comparatively low SINR, wherein e.g. a NR-V2X-capable device 10 may not be able to decode sidelink control information of RAT-1. In some exemplary embodiments, e.g. in this case, a measured RSSI of the failing slots may e.g. be considered as a "contribution" of foreign technology (e.g., the second radio technology RAT-2, e.g. LTE-V2X). In some exemplary embodiments, in turns, this may impact the coexistence scale as e.g. characterized by [equation 1], e.g. rising a higher false detection for the other technology.

In some exemplary embodiments, e.g. to keep false alarms bounded and/or to optimize for a reduced false consideration of radio technology RAT-2, at least some of the following aspects may be considered:

- optimize the coexistence/blocking threshold and have different threshold as function of RSSI measured (mean or other different statistical value), optimize the detection length/window/M-slots; where increasing M will reduce false alarms and gives better indication about the penetration of radio technology RAT-2, optimize the coexistence execution time/scale, i.e., X msec, number of slots where TX procedure alter is considered, etc. E.g., the lower the RSSI level the shorter the execution time.

In some exemplary embodiments, aspects of an optimization, e.g. regarding the coexistence execution procedure and impacting/altering TX procedure may comprise:

In some exemplary embodiments, regarding the execution of one of the above explained exemplary embodiments, a procedure may e.g. define altering the TX procedure. In some other exemplary embodiments, the TX altering process of a technology may be one or more of the following, e.g. during the X msec/X slots for coexistence altering process:

Reduce TX power to avoid interference, e.g., if the detected other technology transmission tends to be far (e.g., based on RSSI, local distributed information, location information as shared by higher layers, etc.), Reduce transmission time/increase periodicity, Use different beam(s) avoiding the direction of the foreign technology, Send an inter UE coordination information to inform other UEs 10' belonging to the same technology in the vicinity of the UE 10 of interest, Stop and alter the TX procedure completely, or postpone, or delay in a queue, Consider the QoS to mandate transmission (if possible with one of the schemes above) or to prioritize transmission after X msec/X times slots elapses and coexistence period is released.

In some exemplary embodiments, e.g. related to a sidelink coexistence procedure, e.g. in a sidelink resource pool, e.g. for (at least) mode 2 (e.g., mode 2 NR SL), e.g. referring to one of the above explained exemplary embodiments, aspects related e.g. to a physical layer procedure (as e.g. disclosed in some accepted standard, for example 3GPP TS 38.214), may be considered, e.g. for allowing a blocking signaling/decision from a first device 10, which may e.g. only decode a signal respective to radio technology RAT-1 and e.g. measure SL RSSI of all available radio technology RAT-1, RAT-2, e.g. in a specific band.

In some exemplary embodiments, the blocking signaling/coexistence scale and/or coexistence metric may e.g. be calculated based on an equation similar to [equation 1]. In some exemplary embodiments, such determined, e.g. computed coexistence scale, may e.g. be compared to a certain blocking threshold (e.g., SL-blocking_signaling_Limit). In some exemplary embodiments, the blocking threshold (e.g., sl-blocking_signaling_Limit) may e.g. be indicated to physical layer, e.g. via higher layers.

In some exemplary embodiments, e.g. herewith, e.g. if a UE is configured with the higher layer parameter, e.g., sl-blocking_signaling_Limit, the UE should compute a coexistence scale value, e.g., from 0 to 1 or from 0% to 100%.

In some exemplary embodiments, the UE procedure, e.g. for determining the coexistence decision based on the coexistence scale and blocking threshold, (e.g., sl-blocking_signaling_Limit) could be the following:

If the coexistence_scale>sl-blocking_signaling_Limit:

Indicate alter-TX-procedure to higher layer,

Indicate CR-alter-indication.

In some exemplary embodiments, the indication may e.g. overwrite the computed CR value with a specific amount.

In some exemplary embodiments, this impact can e.g. be only to a certain amount of slots in the future, e.g., N many slots, which in some exemplary embodiments could be logical slots or physical slots.

In some exemplary embodiments, the N many slots can e.g. be (pre-)configured (e.g., in RRC specifications) and indicated by higher layers.

In some exemplary embodiments, further possible proposals are provided as follows:

Impact: "UE procedure for determining the subset of resources to be reported to higher layers in PSSCH" as follows:

Impact of resources exclusion in Step 5 (e.g., in 3GPP specifications, Rel-16/17): UE may e.g. exclude, e.g. any, candidate single-slot resource, e.g. based on some conditions, and/or Step 6 (e.g., in 3GPP specifications, Rel-16/17): UE may e.g. exclude, e.g. any, candidate single-slot resource, e.g. based on other conditions, e.g. to allow the UE to exclude: any candidate single-slot and/or all candidate slots that meet the following conditions: If coexistence_scale>sl-blocking_signaling_Limit for all configured logical slots or physical slots N-slots, where N is future slots counts to alter the TX procedure for coexistence, e.g., timeWindowSize-sl-alter-Coexistence.

In some exemplary embodiments, at least some of the following aspects are disclosed related to coexistence scale measurements and measurements specification impact.

In some exemplary embodiments, e.g. referring to one of the above explained embodiments in, e.g., physical layer measurements (as e.g. defined by some accepted standard, see for example, 3GPP TS 38.215), the following may be considered in some exemplary embodiments:

Sidelink channel coexistence measurements (new)

Which comprises the following:

Acknowledge Sidelink received signal strength indicator (SL RSSI) to be used for coexistence measurements; wherein for SL RSSI, computation can start from 2nd OFDM symbol for all/any subcarrier spacing (μ).

Sidelink Slot occupancy ratio for NR V2X (SL SOR) (new)

Which comprises the following:

SL SOR compute all slots occupied by NR V2X SL technology (considering e.g. some, for example all, NR SL releases) divided by all configured slots; where in the ratio indicates:

Total number of occupied slots in the past M slots divided by the configured slots in the past M slots (depending on the number of slots configured in a resource pool in the last M slots), where M is, e.g., timeWindowSize-sl-Coexistence Sidelink channel busy ratio (SL CBR) or Sidelink coexisting channel busy ratio (SL CCBR) (new)

Which comprises the following:

SL CBR (existing, which should be modified) or SL CCBR (new) is defined as the portion of sub-channels in the resource pool whose SL RSSI measured by the UE exceed a (pre-)configured threshold which is: CCBR Threshold sensed over M past slots, where M is, e.g., timeWindowSize-sl-Coexistence SL CCBR and/or SL CBR comprises the ratio of slots occupied by any technology occupying the configured resource pool Sidelink co-channel coexistence scale x (SL CoCS) (new)

Which comprises the following:

An equation derived from [equation 1] according to the values computed in this subsection, i.e.:

$$SL\ \text{CoCS}=SL\ SOR/SL\ \text{CCBR} \quad \text{[equation 2]}.$$

Figure 12:
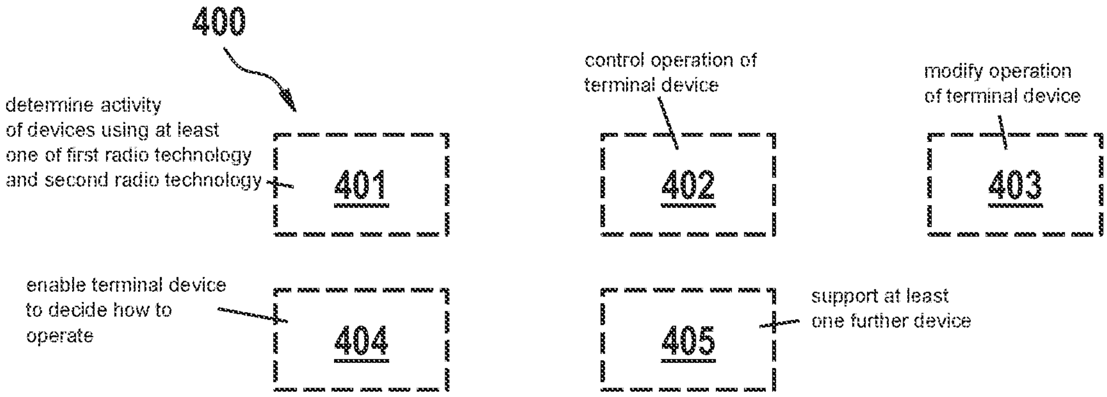
FIG. 12 schematically depicts aspects of use according to exemplary embodiments of the present invention.

Further exemplary embodiments, FIG. 12, relate to a use 400 of the method according to the embodiments and/or of the apparatus 100, 100*a* according to the embodiments and/or of the communication system 1000 according to the embodiments and/or of the computer program PRG, PRG' according to the embodiments and/or of the computer-readable storage medium SM according to the embodiments and/or of the data carrier signal DCS according to the embodiments for at least one of: a) determining 401 an activity of devices using at least one of the first radio technology RAT-1 and the second radio technology RAT-2 within the predetermined radio resources RAD-RES, b) controlling 402, e.g. modifying 403 an operation of the terminal device 10, c) enabling 404 the terminal device 10 to decide how to operate, e.g. with respect to a sidelink communication based on the first radio technology, based on an activity of at least one device, e.g. terminal device, using the second radio technology, d) supporting 405 the at least one further device, e.g. with respect to an activity of devices configured to use the first radio technology associated with the predetermined radio resources and/or with respect to an activity of devices configured to use at least one of the first radio technology and at least one further, e.g. second, radio technology.

In some exemplary embodiments, the principle according to the embodiments may e.g. be used in, but is not limited to, extensions to the IEEE802.11p protocol for car-to-car communication, Industrial IoT communication and NR-V2X.

In some exemplary embodiments, the principle according to the embodiments may e.g. be used in, but is not limited to, signal blocking, e.g. related to transmission signals of a first terminal device 10, e.g. based on the third parameter P-3, which, in some exemplary embodiments, may be beneficial to improve a coexistence of different terminal devices 10, 10', 20, 20' e.g. using different radio technologies RAT-1, RAT-2, e.g. for respective sidelink communications.

Figure 13B:
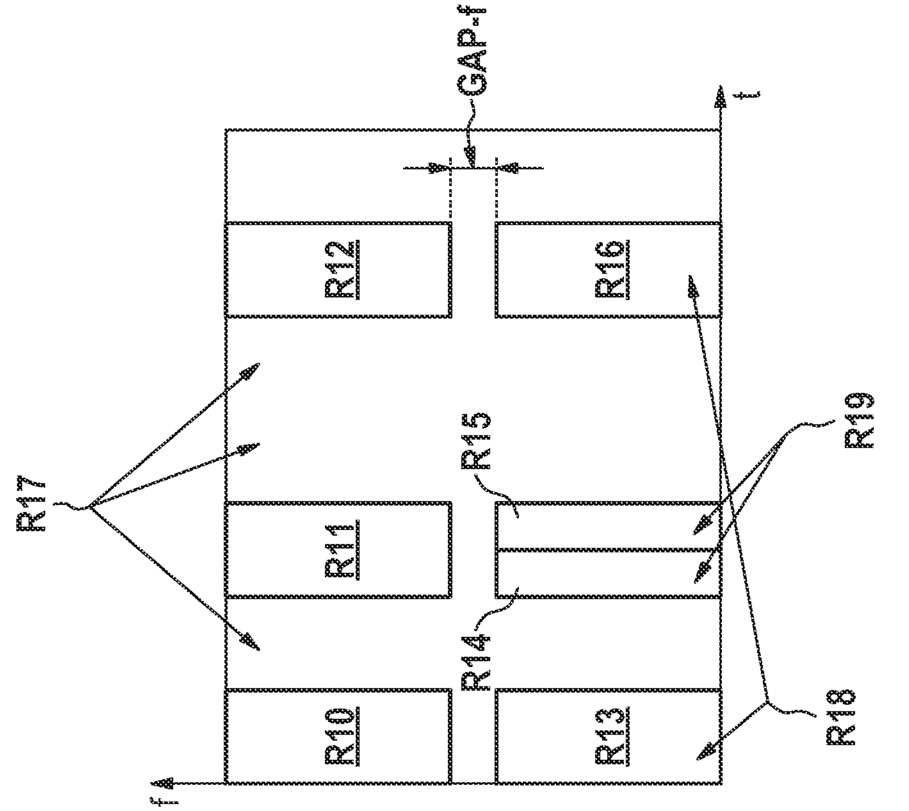
FIG. 13B schematically depicts radio resources according to exemplary embodiments of the present invention.
Figure 13A:
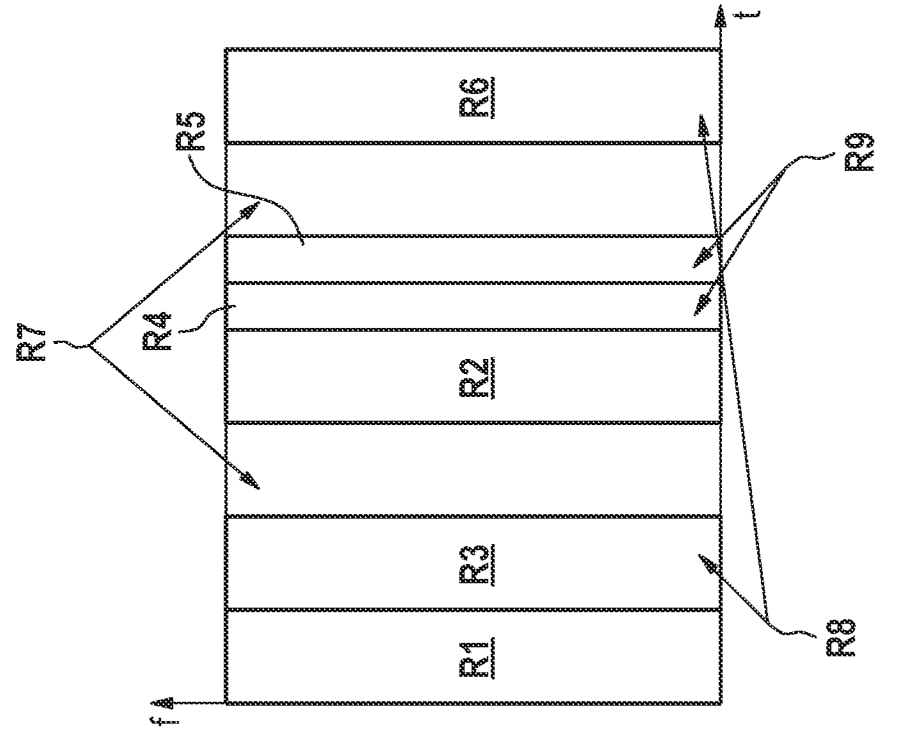
FIG. 13A schematically depicts radio resources according to exemplary embodiments of the present invention.

FIG. 13A schematically depicts radio resources according to exemplary embodiments, e.g. related to exemplary embodiments of a time division multiplexing (TDM) static coexistence, wherein a horizontal axis t symbolizes a time dimension, and wherein a vertical axis f symbolizes a frequency dimension.

In some exemplary embodiments, resources R1, R2, e.g. characterizing slots, are associated with a second radio technology, e.g. based on and/or associated with LTE.

In some exemplary embodiments, resources R3, R4, R5, R6, e.g. characterizing slots, are associated with a first radio technology, e.g. based on and/or associated with 5G NR. The arrows R7 indicate exemplary empty slots, i.e. not assigned to LTE or 5G NR.

In some exemplary embodiments, e.g. the (5G NR-associated) resources R3, R6 may comprise a same numerology like LTE, see arrows R8.

In some exemplary embodiments, e.g. the (5G NR-associated) resources R4, R5 may comprise a different numerology than LTE, see arrows R9.

FIG. 13B schematically depicts radio resources according to exemplary embodiments, e.g. related to exemplary embodiments of a frequency division multiplexing (FDM) static coexistence, wherein a horizontal axis t symbolizes a time dimension, and wherein a vertical axis f symbolizes a frequency dimension.

In some exemplary embodiments, e.g. the (5G NR-associated) resources R14, R15 may comprise a different numerology than LTE, see arrows R19.

In some exemplary embodiments, resources R13, R14, R15, R16, are associated with a first radio technology, e.g. based on and/or associated with 5G NR. The arrows R17 indicate exemplary resources, i.e. not assigned to LTE or 5G NR.

In some exemplary embodiments, e.g. the (5G NR-associated) resources R13, R16 may comprise a same numerology like LTE, see arrows R18.

In some exemplary embodiments, e.g. the (5G NR-associated) resources R14, R15 may comprise a different numerology than LTE, see arrows R19.

In some exemplary embodiments, a frequency gap GAP-f may be provided, e.g. between the resources R10, R11, R12 and the resources R13, R14, R15, R16.

Figure 14B:
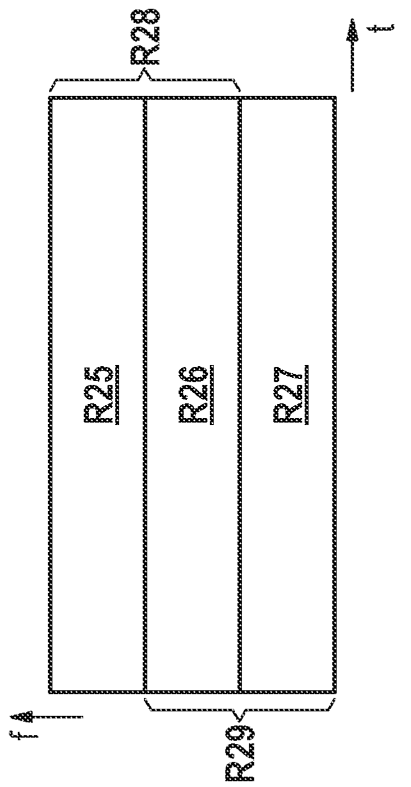
FIG. 14B schematically depicts radio resources according to exemplary embodiments of the present invention.
Figure 14A:
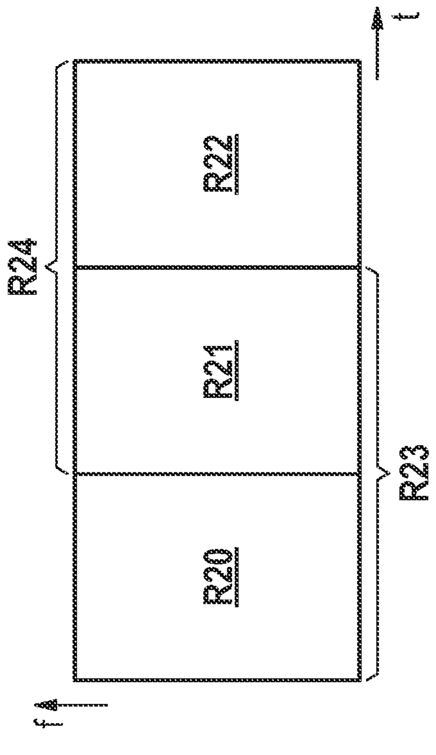
FIG. 14A schematically depicts radio resources according to exemplary embodiments of the present invention.

FIG. 14A schematically depicts radio resources, e.g. symbolizing a sharing of radio resources between two different radio technologies according to exemplary embodiments, wherein a horizontal axis t symbolizes a time dimension, and wherein a vertical axis f symbolizes a frequency dimension.

In some exemplary embodiments, resources R20 symbolize slot(s) guaranteed for a second, e.g. LTE-V2X, radio technology.

In some exemplary embodiments, resources R21 symbolize slot(s) potentially usable by the second, e.g. LTE-V2X, radio technology, e.g. shared slot(s) according to some exemplary embodiments.

In some exemplary embodiments, resources R22 symbolize slot(s) which are preferred to be used by a first, e.g. NR-V2X (e.g., R16/17/18), radio technology.

In some exemplary embodiments, bracket R23 indicates that LTE-V2X may e.g. operate on guaranteed slot(s) R20, plus, optionally, on the "LTE-V2X possible" slots R21, which, in some exemplary embodiments may e.g. be determined via at least one of: a) configuration, b) pre-configuration, c) standardization.

In some exemplary embodiments, bracket R24 indicates that NR-V2X may e.g. operate on the "NR preferred" resources R22 and, optionally, on the "LTE-V2X possible", i.e. shared, slots R21, which, as mentioned above, in some exemplary embodiments may e.g. be determined via at least one of: a) configuration, b) pre-configuration, c) standardization.

FIG. 14B schematically depicts radio resources, e.g. symbolizing a sharing of radio resources between two different radio technologies according to exemplary embodiments, wherein a horizontal axis t symbolizes a time dimension, and wherein a vertical axis f symbolizes a frequency dimension.

In some exemplary embodiments, resources R25 symbolize one or more resources, e.g. subchannels, guaranteed for a second, e.g. LTE-V2X, radio technology.

In some exemplary embodiments, resources R26 symbolize one or more resources, e.g. subchannels, potentially usable by the second, e.g. LTE-V2X, radio technology, e.g. shared subchannels according to some exemplary embodiments.

In some exemplary embodiments, resources R27 symbolize resources, e.g. subchannels, which are preferred (and/or, e.g., guaranteed) to be used by the first, e.g. NR-V2X (e.g., R16/17/18), radio technology.

In some exemplary embodiments, bracket R28 indicates that LTE-V2X may e.g. operate on guaranteed subchannels R25, plus, optionally, on the "LTE-V2X possible" subchannels R26, which, in some exemplary embodiments may e.g. be determined via at least one of: a) configuration, b) pre-configuration, c) standardization.

In some exemplary embodiments, bracket R29 indicates that NR-V2X may e.g. operate on the "NR preferred" (or "NR guaranteed") resources R27 and, optionally, on the "LTE-V2X possible", i.e. shared, subchannels R26, which, as mentioned above, in some exemplary embodiments may e.g. be determined via at least one of: a) configuration, b) pre-configuration, c) standardization.

In the following, further aspects and advantages according to further exemplary embodiments, e.g. related to semi-static resource pool partitioning and overlapping options, are provided, which, in some exemplary embodiments, may be combined with each other and/or with at least one of the exemplary aspects explained above.

In some exemplary embodiments, e.g., for frequently active (e.g., RRC connected) UEs, a semi-static resource pool configuration may be provided by e.g. one or more network operator(s).

In some exemplary embodiments, e.g. configuration updates related to the semi-static resource pool configuration may e.g. consider an LTE vs. NR penetration rate, e.g., in a certain local area or a whole country and/or the required load for each RAT.

In some exemplary embodiments, e.g. for inactive or RRC-Idle UEs, resource pool configurations may be given, e.g., via gNBs SIBs (system information block(s)).

In some exemplary embodiments, e.g. additionally, pre-configuration may be updated (e.g., infrequently), e.g. by a network operator, or, for example, via OTA (over the air) firmware updates. In some exemplary embodiments, the OTA firmware updates may e.g. be less frequent and may e.g. not be suitable, e.g. for at least some, e.g. all, vehicles.

In some exemplary embodiments, therefore, a solution that can optimize a potentially inefficient semi-static resource pool partitioning is proposed to accommodate for at least one of, e.g., a) the LTE vs. NR penetration rate, b) the required load for each RAT, c) etc.

In some exemplary embodiments, the following observation ("Observation 4") is made: In some exemplary embodiments, e.g. for Idle/inactive UEs, semi-static resource pool partitioning can be optimized, e.g. to (e.g., also) consider a variable LTE vs. NR penetration rate, a required load for each RAT, etc . . . .

In some exemplary embodiments, non-overlapping resources, e.g. in TDM or FDM, e.g. associated with separated resource pools, are proposed, see, for example FIG. 13A, 13B, 14A, 14B. In some exemplary embodiments, a TDM resource pool partitioning may e.g. allow NR high numerologies (e.g., 30 and 60 kHz SCS) to coexist. In some exemplary embodiments, e.g. a 1 ms (15 kHz) span of each LTE sidelink slot may be considered, see, for example, FIG. 13A for more details.

In some exemplary embodiments, the following observation ("Observation 5") is made: In some exemplary embodiments, the following observation, e.g. TDM resource pool partitioning can allow co-channel coexistence of e.g. LTE V2X and e.g. NR SL, e.g. with different sub-carrier spacing (e.g., 30 and 60 kHz).

In some exemplary embodiments, e.g. for FDMed approaches, a resource partitioning may be, e.g. still, quasi-static and may e.g. allow for frequent adaption, e.g. to the different radio technologies' load, i.e., may not split the band deterministically.

In some exemplary embodiments, e.g. additionally, other aspects may be considered, e.g., an AGC issue, e.g. when NR SL has PSFCH transmission. In some exemplary embodiments, issues or aspects, e.g. all issues or aspects, that may be impacting a semi-static resource pool partitioning, e.g. in FDMed fashion, may e.g. be considered, e.g. similarly, e.g. for a dynamic co-channel coexistence, e.g., at least if LTE and NR transmissions should coexist, e.g. in overlapping time slot (but, e.g., different frequency).

In some exemplary embodiments, e.g. related to FDM-based semi-static resource pool partitioning, e.g. as a possible solution for co-channel coexistence, at least one of the following aspects is proposed:

- Handling of numerologies other than 15 kHz,
- Configuration of overlapping time resources for LTE SL and NR SL, e.g. including in slots where NR PSFCH may be transmitted, taking into account the handling of AGC,
- Mechanisms to avoid dropping of NR SL transmissions impacted by LTE SL transmissions,
- FFS: Other aspects.

As exemplarily mentioned above, FIG. 13A, 13B exemplarily depict possible co-channel coexistence resource configurations for aspects of TDM and FDM, respectively. In some exemplary embodiments, same and/or different numerologies related to FIG. 13A, 13B are for illustration only, and in some exemplary embodiments they may, e.g., not happen simultaneously in a same resource pool.

In the following, further aspects and advantages according to further exemplary embodiments, e.g. related to quasi-dynamic resource portioning or partitioning, respectively, e.g. using Type B devices (e.g., as exemplarily defined by 3GPP R1-2205588), are provided, which, in some exemplary embodiments, may be combined with each other and/or with at least one of the exemplary aspects explained above.

In some exemplary embodiments, a possible quasi-static or quasi-dynamic resource partitioning, e.g. between LTE and NR sidelink, is proposed, e.g. to exploit type B devices efficiently.

In some exemplary embodiments, different resource pools can be configured or preconfigured (or determined by standardization), e.g. either in time or frequency, as e.g. exemplarily depicted by FIG. 14A, 14B, where in some exemplary embodiments, e.g. only, some portion(s) of the resource pool is(are) considered as an overlapping portion(s).

In some exemplary embodiments, e.g. other, e.g. non-overlapping resource portions, can e.g. be configured as follows: guaranteed for LTE only and/or preferred for NR V2X.

In some exemplary embodiments, the overlapping resource part, e.g. the shared part R21 of FIG. 14A or the shared part R26 of FIG. 14B, may e.g. be used based on a detect-and-vacate-like approach, handled by, e.g., Type-B quasi-dynamic co-channel coexistence. In this case, NR type B devices may e.g. be configured to vacate such a shared set of resources, e.g. if LTE transmissions are indirectly detected using, e.g., energy detection.

In some exemplary embodiments, an advantage of the quasi-dynamic resource portioning scheme as exemplarily disclosed with reference to FIG. 14A, 14B is e.g. that vacating the shared resources R21, R26 may be in favor of the higher density RAT, i.e., NR sidelink transmission can easily replace the LTE V2X, e.g. once the LTE percentage drops.

In some exemplary embodiments, another clear advantage in this case may be that the dedicated/preferred resources R22, R27 for NR V2X SL can e.g. allow early deployment of Rel-16 and 17.

In some exemplary embodiments, thus, it is proposed to provide a detect-and-vacate-like approach, which in some exemplary embodiments may e.g. allow an easy replacement of LTE V2X, e.g. once its penetration rate drops.

What is claimed is:

1. A computer-implemented method for processing data associated with a first terminal device configured to use at least a first radio technology for communicating with at least one further terminal device over a sidelink interface based on the first radio technology, the method comprising the following steps:

determining, by the first terminal device, a first parameter characterizing an activity of further first terminal devices configured to use the first radio technology associated with predetermined radio resources, wherein the predetermined radio resources comprise shared sidelink radio resources, wherein the first parameter characterizes sidelink sensing information comprising at least one of a Reference Signal Received Power (RSRP), a Received Signal Strength Indicator (RSSI), and a sidelink slot occupancy ratio;

determining, by a second terminal device, a second parameter characterizing an activity of further second terminal devices configured to use a second radio technology, which is different from the first radio technology, associated with the predetermined radio resources, wherein determining the second parameter includes determining the second parameter based on a determined energy of a signal received over the sidelink interface, wherein the energy of the signal is associated with the predetermined radio resources;

providing, by the first terminal device to the second terminal device, the first parameter as coexistence assisting information;

evaluating, by the second terminal device, the first parameter and the second parameter to determine a coexistence scale for the predetermined radio resources; and altering, by the second terminal device, a transmission procedure based on the evaluation.

2. The method according to claim 1, wherein the first radio technology is 5G NR V2X, and/or the second radio technology is LTE V2X.

3. The method according to claim 1, wherein the first radio technology is any 3GPP C-V2X, and/or the second radio technology is non-3GPP V2X.

4. The method according to claim 1, wherein evaluating the first parameter and the second parameter to determine the coexistence scale for the predetermined radio resources comprises at least one of:

comparing the first parameter with the second parameter, determining a third parameter based on the first parameter and the second parameter, wherein the third parameter is determined as a ratio of the first parameter to the second parameter, comparing the third parameter with a predetermined threshold, performing an operation of the first terminal device, at least temporarily, based on at least one of the comparing of the third parameter with the predetermined threshold, and the comparing of the first parameter with the second parameter.

5. The method according to claim 4, further comprising at least one of:

transmitting, by the first terminal device to at least one further terminal device, first information characterizing at least one of the first parameter, the second parameter, the third parameter, a result of the comparing of the first parameter with the second parameter, receiving, by the first terminal device from at least one further terminal device, second information characterizing an activity of at least one device configured to use at least the second radio technology associated with the predetermined radio resources, performing an operation of the first terminal device, at least temporarily, based on at least one of the first information and the second information.

6. The method according to claim 1, wherein altering the transmission procedure includes at least one of:

altering a channel occupancy ratio, enabling direct blocking, postponing at least one transmission, changing radio resources, reducing a transmit power, reducing a transmission time, increasing a transmission periodicity, changing at least one radio beam to avoid a direction of at least one device using the second radio technology, transmitting third information based on at least one of the first information and the second information, as inter-terminal device coordination information, to inform at least one further terminal device using at least the first radio technology, considering a quality of service, and prioritizing transmissions.

7. The method according to claim 1, further comprising using the first radio technology to detect an activity of the second radio technology in a configured shared channel.

8. The method according to claim 1, wherein the method is used for at least one of:

determining an activity of devices using at least one of the first radio technology and the second radio technology within the predetermined radio resources, controlling an operation of the terminal device, enabling the terminal device to decide how to operate with respect to a sidelink communication based on the first radio technology, based on an activity of at least one device using the second radio technology, and supporting at least one further device with respect to an activity of devices configured to use the first radio technology associated with the predetermined radio resources and/or with respect to an activity of devices configured to use at least one of the first radio technology and the second radio technology.

9. An apparatus for a first terminal device comprising at least one processor, the at least one processor configured to process data associated with the first terminal device, the first terminal device configured to use at least a first radio technology for communicating with at least one further terminal device over a sidelink interface based on the first radio technology, the at least one processor configured to:

determine a first parameter characterizing an activity of further first terminal devices configured to use the first radio technology associated with predetermined radio resources, wherein the predetermined radio resources comprise shared sidelink radio resources, wherein the first parameter characterizes sidelink sensing information comprising at least one of a Reference Signal Received Power (RSRP), a Received Signal Strength Indicator (RSSI), and a sidelink slot occupancy ratio; and determine a second parameter characterizing an activity of further second terminal devices configured to use a second radio technology, which is different from the first radio technology, associated with the predetermined radio resources, wherein to determine the second parameter includes to determine the second parameter based on a determined energy of a signal received over the sidelink interface, wherein the energy of the signal is associated with the predetermined radio resources, wherein the first parameter is determined by the first terminal device and the second parameter is determined by a second terminal device, wherein the first parameter is provided by the first terminal device to the second terminal device as coexistence assisting information, wherein the second terminal device evaluates the first parameter and the second parameter to determine a coexistence scale for the predetermined radio resources, and wherein the second terminal device alters a transmission procedure based on the evaluation.

10. An apparatus for a first terminal device, comprising:

a memory;

at least one processor coupled to the memory and configured to process data associated with the first terminal device, the first terminal device configured to use at least a first radio technology for communicating with at least one further terminal device over a sidelink interface based on the first radio technology, the at least one processor configured to:

determine a first parameter characterizing an activity of further first terminal devices configured to use the first radio technology associated with predetermined radio resources, wherein the predetermined radio resources comprise shared sidelink radio resources, wherein the first parameter characterizes sidelink sensing information, and wherein the sidelink sensing information comprises at least one of a Reference Signal Received Power (RSRP), a Received Signal Strength Indicator (RSSI), and a sidelink slot occupancy ratio; and determine a second parameter characterizing an activity of further second terminal devices configured to use a second radio technology, which is different from the first radio technology, associated with the predetermined radio resources, wherein to determine the second parameter includes to determine the second parameter based on a determined energy of a signal received over the sidelink interface, wherein the energy of the signal is associated with the predetermined radio resources, wherein the first parameter is determined by the first terminal device and the second parameter is determined by a second terminal device, wherein the first parameter is provided by the first terminal device to the second terminal device as coexistence assisting information, wherein the second terminal device evaluates the first parameter and the second parameter to determine a coexistence scale for the predetermined radio resources, and wherein the second terminal device alters a transmission procedure based on the evaluation.

11. A first terminal device, comprising:

at least one apparatus configured to process data associated with the first terminal device, the first terminal device configured to use at least a first radio technology for communicating with at least one further terminal device over a sidelink interface based on the first radio technology, the apparatus configured to:

determine a first parameter characterizing an activity of further first terminal devices configured to use the first radio technology associated with predetermined radio resources, wherein the predetermined radio resources comprise shared sidelink radio resources, wherein the first parameter characterizes sidelink sensing information, and wherein the sidelink sensing information comprises at least one of a Reference Signal Received Power (RSRP), a Received Signal Strength Indicator (RSSI), and a sidelink slot occupancy ratio; and determine a second parameter characterizing an activity of further second terminal devices configured to use at least one of a second radio technology, which is different from the first radio technology, associated with the predetermined radio resources, wherein determining the second parameter includes determining the second parameter based on a determined energy of a signal received over the sidelink interface, wherein the energy of the signal is associated with the predetermined radio resources, wherein the first parameter is determined by the first terminal device and the second parameter is determined by a second terminal device, wherein the first parameter is provided by the first terminal device to the second terminal device as coexistence assisting information, wherein the second terminal device evaluates the first parameter and the second parameter to determine a coexistence scale for the predetermined radio resources, and wherein the second terminal device alters a transmission procedure based on the evaluation.

12. A communication system, comprising:

at least one first terminal device, each terminal device of the at least one first terminal device including at least one apparatus configured to process data associated with the respective terminal device, each respective terminal device configured to use at least a first radio technology for communicating with at least one further terminal device over a sidelink interface based on the first radio technology, the apparatus configured to:

determine a first parameter characterizing an activity of further first terminal devices configured to use the first radio technology associated with predetermined radio resources, wherein the predetermined radio resources comprise shared sidelink radio resources, wherein the first parameter characterizes sidelink sensing information comprising at least one of a Reference Signal Received Power (RSRP), a Received Signal Strength Indicator (RSSI), and a sidelink slot occupancy ratio; and determine a second parameter characterizing an activity of further second terminal devices configured to use a second radio technology, which is different from the first radio technology, associated with the predetermined radio resources, wherein to determine the second parameter includes to determine the second parameter based on a determined energy of a signal received over the sidelink interface, wherein the energy of the signal is associated with the predetermined radio resources, wherein the first parameter is determined by a first terminal device and the second parameter is determined by a second terminal device, wherein the first parameter is provided by the first terminal device to the second terminal device as coexistence assisting information, wherein the second terminal device evaluates the first parameter and the second parameter to determine a coexistence scale for the predetermined radio resources, and wherein the second terminal device alters a transmission procedure based on the evaluation.

13. A non-transitory computer-readable storage medium on which is stored a computer program including instructions for processing data associated with a first terminal device configured to use at least a first radio technology for communicating with at least one further terminal device over a sidelink interface based on the first radio technology, the instructions, when executed by a computer, causing the computer to perform the following steps:

determining, by a first terminal device, a first parameter characterizing an activity of further first terminal devices configured to use the first radio technology associated with predetermined radio resources, wherein the predetermined radio resources comprise shared sidelink radio resources, wherein the first parameter characterizes sidelink sensing information, and wherein the sidelink sensing information comprises at least one of a Reference Signal Received Power (RSRP), a Received Signal Strength Indicator (RSSI), and a sidelink slot occupancy ratio; and determining, by a second terminal device, a second parameter characterizing an activity of further second terminal devices configured to use a second radio technology, which is different from the first radio technology, associated with the predetermined radio resources, wherein determining the second parameter includes determining the second parameter based on a determined energy of a signal received over the sidelink interface, wherein the energy of the signal is associated with the predetermined radio resources;

providing, by the first terminal device to the second terminal device, the first parameter as coexistence assisting information;

evaluating, by the second terminal device, the first parameter and the second parameter to determine a coexistence scale for the predetermined radio resources; and altering, by the second terminal device, a transmission procedure based on the evaluation.

* * * * *